(12) United States Patent
Watanabe

(10) Patent No.: US 10,756,954 B2
(45) Date of Patent: Aug. 25, 2020

(54) INFORMATION PROCESSING SYSTEM, RELAY DEVICE, AUXILIARY RELAY DEVICE, MANAGEMENT DEVICE, METHOD, AND STORAGE MEDIUM

(71) Applicant: NEC Corporation, Minato-ku, Tokyo (JP)

(72) Inventor: Yoshikazu Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 92 days.

(21) Appl. No.: 16/303,281

(22) PCT Filed: May 17, 2017

(86) PCT No.: PCT/JP2017/018497
§ 371 (c)(1),
(2) Date: Nov. 20, 2018

(87) PCT Pub. No.: WO2017/204049
PCT Pub. Date: Nov. 30, 2017

(65) Prior Publication Data
US 2019/0207806 A1    Jul. 4, 2019

(30) Foreign Application Priority Data
May 24, 2016   (JP) .................................. 2016-103149

(51) Int. Cl.
*H04L 12/24*         (2006.01)
*G06F 13/40*         (2006.01)
(Continued)

(52) U.S. Cl.
CPC ...... *H04L 41/0668* (2013.01); *G06F 13/4027* (2013.01); *H04B 3/36* (2013.01); *H04B 7/155* (2013.01); *H04L 67/10* (2013.01)

(58) Field of Classification Search
CPC . H04L 43/0811; H04L 41/0668; H04L 67/10; H04L 29/14; H04L 41/0663;
(Continued)

(56) References Cited

U.S. PATENT DOCUMENTS

2010/0137021 A1\* 6/2010 Sharret ................. H04W 88/04
                                                          455/550.1
2011/0235502 A1    9/2011 Yamada
(Continued)

FOREIGN PATENT DOCUMENTS

JP        2011-211297 A       10/2011
JP        2013-098819 A        5/2013
(Continued)

OTHER PUBLICATIONS

International Search Report for PCT Application No. PCT/JP2017/018497, dated Aug. 8, 2017.
(Continued)

*Primary Examiner* — Maharishi V Khirodhar
*Assistant Examiner* — Kenneth P Hunt

(57) ABSTRACT

An information processing system according to the present invention includes: a relay device communicates with a server through a first communication line and a device through a second communication line, and relays data between the first communication line and the second communication line; an auxiliary relay device communicates with the server through a third communication line and the device through the second communication line, and relays data between the third communication line and the second communication line; and a management device detects a failure on the first communication line and controls the auxiliary relay device in such a way as to establish an alternative communication channel by using the third communication line and the auxiliary relay device when the
(Continued)

US 10,756,954 B2

Page 2 failure is detected and to deliver the auxiliary relay device to a location where the auxiliary relay device is connected to the second communication line.

13 Claims, 21 Drawing Sheets

(51) Int. Cl.
*H04B 7/155* (2006.01)
*H04L 29/08* (2006.01)
*H04B 3/36* (2006.01)

(58) Field of Classification Search
CPC ....... H04L 41/0654–0695; H04L 41/06; H04L 45/28; H04B 7/155; H04B 3/36; G06F 13/4027
See application file for complete search history.

(56) References Cited

U.S. PATENT DOCUMENTS

| | | | |
|---|---|---|---|
| 2012/0236708 A1 | 9/2012 | Kompella et al. | |
| 2012/0315841 A1* | 12/2012 | Zhou | H04B 7/2606 455/11.1 |
| 2013/0107794 A1 | 5/2013 | Yamada | |
| 2014/0349569 A1* | 11/2014 | Hyde | H04B 7/15507 455/11.1 |
| 2015/0172173 A1 | 6/2015 | Mitsumori | |
| 2015/0180757 A1 | 6/2015 | Oshiba | |
| 2016/0241623 A1* | 8/2016 | Zoulias | H04L 65/601 |
| 2017/0244594 A1* | 8/2017 | Shiota | H04L 43/16 |
| 2017/0346677 A1* | 11/2017 | Suryanarayana | H04L 67/12 |
| 2018/0068553 A1* | 3/2018 | Amir | G08B 25/004 |
| 2018/0323862 A1* | 11/2018 | Gong | H04W 16/18 |
| 2019/0335341 A1* | 10/2019 | Ju | H04B 7/2606 |

FOREIGN PATENT DOCUMENTS

| | | |
|---|---|---|
| JP | 2014-512110 A | 5/2014 |
| JP | 2015-119227 A | 6/2015 |
| WO | 2014/017140 A1 | 1/2014 |

OTHER PUBLICATIONS

English translation of Written opinion for PCT Application No. PCT/JP2017/018497.

* cited by examiner

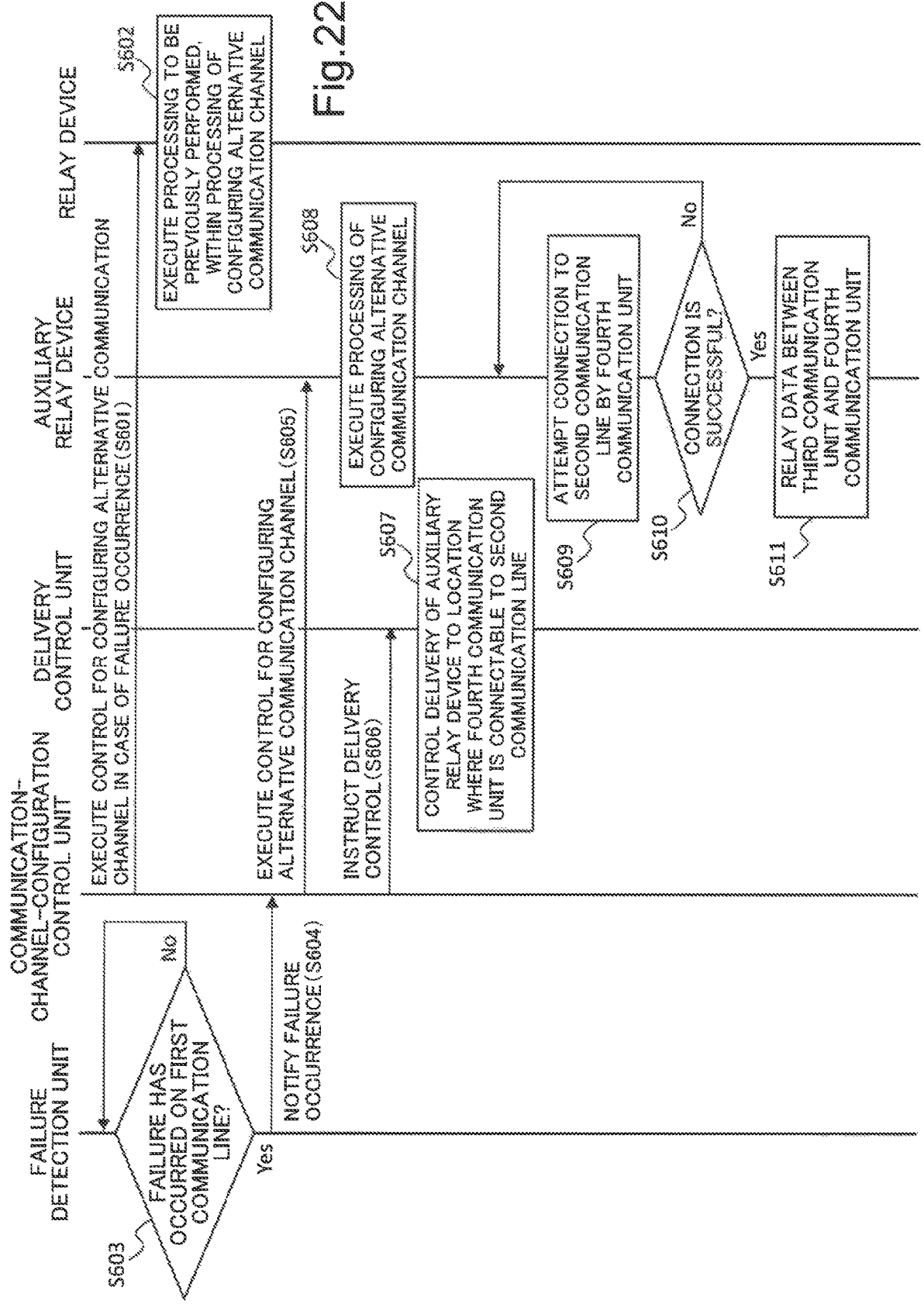

INFORMATION PROCESSING SYSTEM, RELAY DEVICE, AUXILIARY RELAY DEVICE, MANAGEMENT DEVICE, METHOD, AND STORAGE MEDIUM

This application is a National Stage Entry of PCT/JP2017/018497 filed on May 17, 2017, which claims priority from Japanese Patent Application 2016-103149 filed on May 24, 2016, the contents of all of which are incorporated herein by reference, in their entirety.

TECHNICAL FIELD

The present invention relates to a technology handling a communication line failure in an information processing system connecting a large number of widely distributed computers by a network.

BACKGROUND ART

An information processing system connecting a large number of widely distributed computers by a network is known. Such an information processing system is also hereinafter simply described as a widely distributed information processing system. For example, a machine to machine (M2M) system and an internet of things (IoT) are given as representatives of a widely distributed information processing system. A hierarchical structure is widely used in a widely distributed information processing system. For example, a server mainly performing information processing in a system is placed in a cloud connected to the Internet. On the other hand, a terminal and a device using the server are placed at a location physically remote from the server, such as a building or a site of a system user. A relay device relaying data is placed between the terminal and the device, and the server. A relay device installed at a location relatively close to a terminal and a device will be hereinafter touched on. For example, a relay device communicates with a terminal and a device by using a local area network (LAN), a personal area network (PAN), a home area network (HAN), and the like. Further, for example, a relay device is connected to the Internet by using a wide area network (WAN) and communicates with a server. Further, a relay device may not only relay data but also perform primary processing on a request and the like from a terminal or a device.

An example of a widely distributed information processing system is described in PTL 1. A related art described in PTL 1 provides redundancy for a relay device in a widely distributed information processing system. The related art associates an auxiliary relay device with a main relay device. Then, the auxiliary relay device periodically receives information indicating a state of a session related to user equipment, from the main relay device. Then, the auxiliary relay device restores a session being down, in response to a failure of the main relay device, and restores a session state of the user equipment.

CITATION LIST

Patent Literature

PTL 1: Japanese Translation of PCT International Application Publication No. 2014-512110

SUMMARY OF INVENTION

Technical Problem

However, not only a failure of a relay device itself but also a failure on a communication line connecting a relay device and a server, such as a WAN, may occur in a widely distributed information processing system. In this case, the information processing system becomes unavailable. PTL 1 describes a technology of handling a failure of a relay device itself but does not describe a technology of handling a failure occurring on a communication line connecting a relay device and a server.

In order to improve availability of a widely distributed information processing system, redundancy needs to be provided for a communication line connecting a relay device and a server. A number of servers is relatively small and also, for example, when a server is placed in a cloud, a redundancy function of the cloud may be used. On the other hand, a number of relay devices being set at locations relatively close to terminals and devices is very large since the relay devices are placed at each user building or on each floor. A large amount of line charges and communication equipment charges are required in order to provide auxiliary communication lines for providing redundancy for communication lines connecting the individual relay devices to servers. Additionally, a type of suitable auxiliary communication line may vary depending on a spot where a failure occurs or details of the failure. A yet larger amount of charges are required for providing the individual relay devices with a plurality of types of auxiliary relay devices for redundancy and a plurality of auxiliary communication lines.

The present invention has been made in view of such an issue. Specifically, an object of the present invention is to provide a technology of improving availability in a widely distributed information processing system, without providing an individual relay device with an auxiliary communication line that provides redundancy for a communication line connecting the relay device and a server.

Solution to Problem

For providing the above-object, an information processing system according to the present invention includes: a first communication line, a second communication line, a third communication line, a relay device, an auxiliary relay, and a management device.

The relay device includes: a first memory; and at least one first processor coupled to the memory. The first processor performs first operations. The first operations includes: controlling communication with a server through the first communication line, controlling communication with a device through the second communication line, and relaying data between the first communication line and the second communication line.

The auxiliary relay device includes: a second memory; and at least one second processor coupled to the memory. The second processor performs second operations. The second operations includes: controlling communication with the server through the third communication line, and controlling communication with the device through the second communication line, and relaying data between the third communication line and the second communication line.

The management device includes: a third memory; and at least one third processor coupled to the memory. The third processor performs third operations. The third operations includes: detecting a failure on the first communication line;

when the failure is detected, controlling the auxiliary relay device in such a way as to establish an alternative communication channel being an alternative to the first communication line by using the third communication line and the auxiliary relay device; and controlling the auxiliary relay device in such a way as to deliver the auxiliary relay device to a location where the auxiliary relay device is connected to the second communication line.

A relay device according to the present invention is included in an information processing system including the first communication line, the second communication line, the third communication line, the auxiliary relay device, and the management device which are above-mentioned. The relay device includes: a first memory; and at least one first processor coupled to the memory. The first processor performs first operations. The first operations includes: controlling communication with a server through the first communication line; controlling communication with a device through the second communication line; and relaying data between the first communication line and the second communication line.

A auxiliary relay device according to the present invention is included in an information processing system including the first communication line, the second communication line, the third communication line, the relay device, and the management device which are above-mentioned. The auxiliary relay device includes: a second memory; and at least one second processor coupled to the memory. The second processor performs second operations. The second operations includes: controlling communication with the server through the third communication line; controlling communication with the device through the second communication line; relaying data between the third communication line and the second communication line.

A management device according to the present invention is included in an information processing system including the first communication line, the second communication line, the third communication line, the relay device and the auxiliary relay device which are above-mentioned.

The management device includes: a third memory; and at least one third processor coupled to the memory. The third processor performs third operations. The third operations includes: detecting a failure on the first communication line; when the failure is detected, controlling the auxiliary relay device in such a way as to establish an alternative communication channel being an alternative to the first communication line by using the third communication line and the auxiliary relay device; and controlling the auxiliary relay device in such a way as to deliver the auxiliary relay device to a location where the auxiliary relay device is connected to the second communication line.

A method according to the present invention is for an information processing system. The information processing system includes: a first communication line; a second communication line; a third communication line; a relay device; an auxiliary relay device; and a management device. The method includes:

by the relay device, controlling communication with a server through the first communication line, controlling communication with a device through the second communication line, and relaying data between the first communication line and the second communication line, by the auxiliary relay device, controlling communication with the server through the third communication line, controlling communication with the device through the second communication line, and relaying data between the third communication line and the second communication, and by the management device detecting a failure on the first communication line, when the failure is detected, controlling the auxiliary relay device in such a way as to establish an alternative communication channel being an alternative to the first communication line by using the third communication line and the auxiliary relay device, and controlling the auxiliary relay device in such a way as to deliver the auxiliary relay device to a location where the auxiliary relay device is connected to the second communication line.

A non-transitory computer-readable storage medium embodies a program. The program causes a first computer device to perform a first method, cases a second computer device to perform a second method, and causes a third computer device to perform a third method.

The first method includes: controlling communication with a server through the first communication line, controlling communication with a device through the second communication line, and relaying data between the first communication line and the second communication line.

The second method includes: controlling communication with the server through the third communication line, controlling communication with the device through the second communication line, and relaying data between the third communication line and the second communication line.

The third method includes: detecting a failure on the first communication line, controlling the auxiliary relay device in such a way as to establish an alternative communication channel being an alternative to the first communication line by using the third communication line and the auxiliary relay device when the failure is detected, and controlling the auxiliary relay device in such a way as to deliver the auxiliary relay device to a location where the auxiliary relay device is connected to the second communication line.

Advantageous Effects of Invention

The present invention is able to provide a technology of improving availability in a widely distributed information processing system, without providing an individual relay device with an auxiliary communication line that provides redundancy for a communication line connecting the relay device and a server.

BRIEF DESCRIPTION OF DRAWINGS

FIG. 22 is a sequence diagram illustrating an operation of the information processing system according to the sixth example embodiment of the present invention.

EXAMPLE EMBODIMENT

Example embodiments of the present invention will be described in detail below with reference to drawings.

First Example Embodiment

Figure 1:
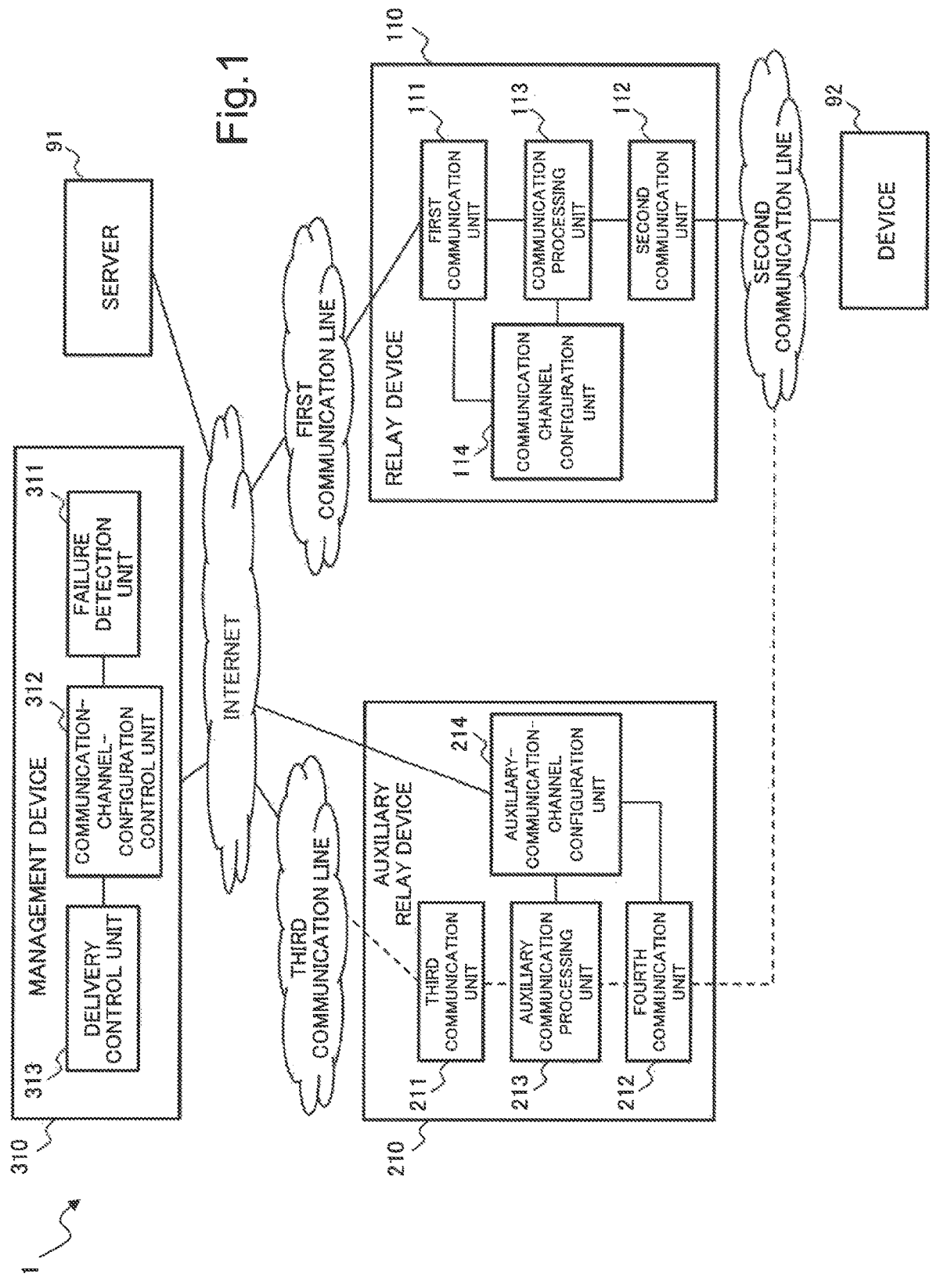
FIG. 1 is a block diagram illustrating a configuration of an information processing system according to a first example embodiment of the present invention.

FIG. 1 illustrates a functional block configuration of an information processing system 1 according to a first example embodiment of the present invention. In FIG. 1, the information processing system 1 includes a relay device 110, an auxiliary relay device 210, and a management device 310.

The relay device 110 is a device relaying data transmitted and received between a server 91 connected through a first communication line and a device 92 connected through a second communication line. The relay device 110 includes a first communication unit 111, a second communication unit 112, a communication processing unit 113, and a communication channel configuration unit 114. Details of the respective functional blocks will be described later.

The server 91 is a device performing information processing for providing a service. Further, the device 92 is a device using a service by the server 91.

The auxiliary relay device 210 is configured to be connectable to the server 91 through a third communication line. The auxiliary relay device 210 is a device that may be connected to the second communication line in order to configure an alternative communication channel serving as an alternative to the first communication line when a failure occurs on the first communication line. The auxiliary relay device 210 includes a third communication unit 211, a fourth communication unit 212, an auxiliary communication processing unit 213, and an auxiliary-communication-channel configuration unit 214. Details of the respective functional blocks will be described later.

Furthermore, during normal operation, the auxiliary relay device 210 may be placed at a location not connectable to the second communication line connected to the relay device 110. In this case, when a failure occurs on the first communication line, the auxiliary relay device 210 is delivered to a location where the auxiliary relay device 210 is connectable to the second communication line, under control of the management device 310 to be described later.

The management device 310 is a device controlling establishment of the alternative communication channel being an alternative to the first communication line. The alternative communication channel is configured to include the third communication line and the auxiliary relay device 210. The management device 310 includes a failure detection unit 311, a communication-channel-configuration control unit 312, and a delivery control unit 313. Details of the respective functional blocks will be described later.

Further, it is assumed that each of the management device 310 and the server 91 is connected to the Internet. The Internet is a network in which a large number of networks are mutually connected. Each of the management device 310 and the server 91 may be connected to the Internet through an unillustrated WAN, LAN, or the like. It is further assumed that the first communication line and the third communication line are lines connected to the Internet. It is further assumed that the second communication line is a communication line connecting the device 92 to the relay device 110.

In FIG. 1, a solid line connecting rectangles representing functional blocks indicates that the functional blocks are mutually communicable during normal operation of the information processing system 1. Further, a broken line connecting rectangles representing functional blocks indicates that the functional blocks may be connected when a failure occurs on the first communication line.

Further, while FIG. 1 illustrates one each of the relay device 110, the auxiliary relay device 210, and the management device 310, numbers of the devices included in the information processing system 1 are not limited. Further, while FIG. 1 illustrates one each of the server 91 and the device 92, numbers of the devices to which the information processing system 1 is connectable are not limited.

Figure 2:
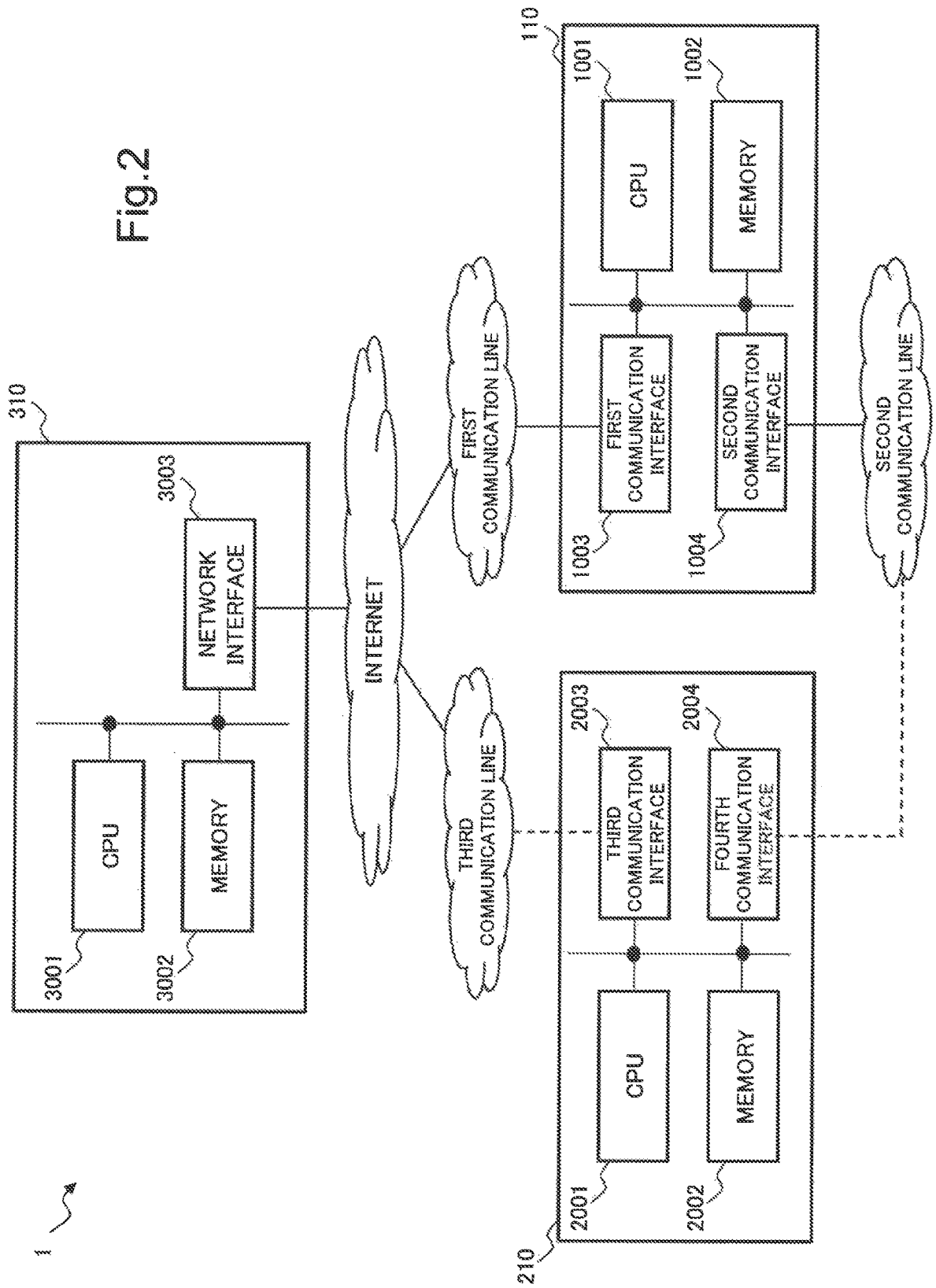
FIG. 2 is a diagram illustrating a hardware configuration example of the information processing system according to the first example embodiment of the present invention.

The information processing system 1 may be configured with hardware components as illustrated in FIG. 2. In FIG. 2, the relay device 110 includes a central processing unit (CPU) 1001, a memory 1002, a first communication interface 1003, and a second communication interface 1004. The memory 1002 is composed of a random access memory (RAM), a read only memory (ROM), an auxiliary storage device, and the like. The first communication interface 1003 is an interface connected to the first communication line. The second communication interface 1004 is an interface connected to the second communication line. In this case, the first communication unit 111 is configured with the first communication interface 1003. Further, the second communication unit 112 is configured with the second communication interface 1004. Further, the communication processing unit 113 and the communication channel configuration unit 114 are configured with the CPU 1001 reading and executing a computer program stored in the memory 1002.

Further, in FIG. 2, the auxiliary relay device 210 includes a CPU 2001, a memory 2002, a third communication interface 2003, and a fourth communication interface 2004. The memory 2002 is composed of a RAM, a ROM, an auxiliary storage device, and the like. The third communication interface 2003 is an interface connected to the third communication line. The fourth communication interface 2004 is an interface configurable to be connected to the second communication line. In this case, the third communication unit 211 is configured with the third communication interface 2003. Further, the fourth communication unit 212 is configured with the fourth communication interface 2004. Further, the auxiliary communication processing unit 213 and the auxiliary-communication-channel configuration unit 214 are configured with the CPU 2001 reading and executing a computer program stored in the memory 2002.

Further, in FIG. 2, the management device 310 includes a CPU 3001, a memory 3002, and a network interface 3003. The memory 3002 is composed of a RAM, a ROM, an auxiliary storage device, and the like. The network interface 3003 is an interface connected to a network. For example, the network interface 3003 may be an interface connected to a network, such as a WAN or a LAN which is connected to the Internet.

Next, details of the respective functional blocks in the relay device 110 will be described.

The first communication unit 111 is connected to the first communication line and communicates with the server 91.

The second communication unit 112 is connected to the second communication line and communicates with the device 92.

The communication processing unit 113 relays data between the first communication unit 111 and the second communication unit 112.

The communication channel configuration unit 114 performs processing for configuring (setting up) the aforementioned alternative communication channel, under control of the communication-channel-configuration control unit 312 in the management device 310. For example, the processing for configuring the alternative communication channel may be processing of previously transmitting to the management device 310 through the first communication unit 111 information to be required by the auxiliary relay device 210 when configuring the alternative communication channel.

The information to be required may be information for connecting to the second communication line. Further, such information may be information for operating in place of the relay device 110 on the second communication line.

Next, details of the respective functional blocks in the auxiliary relay device 210 will be described.

The third communication unit 211 is configured to be connected to the third communication line and be communicable to the server 91. However, the third communication unit 211 may not perform communication with the server 91 during normal operation.

The fourth communication unit 212 may be configured to be connected to the second communication line and perform communication. However, the fourth communication unit 212 may not be connected to the second communication line during normal operation.

The auxiliary communication processing unit 213 relays data between the third communication unit 211 and the fourth communication unit 212.

The auxiliary-communication-channel configuration unit 214 performs processing of connecting the fourth communication unit 212 to the second communication line and thereby configuring the aforementioned alternative communication channel, under control of the communication-channel-configuration control unit 312, details of which is describe later, in the management device 310.

For example, the auxiliary-communication-channel configuration unit 214 may perform processing of receiving from the communication-channel-configuration control unit 312 in the management device 310 information to be required when configuring the alternative communication channel and setting the information to the respective units at least including the fourth communication unit 212. Then, the auxiliary-communication-channel configuration unit 214 may control the fourth communication unit 212 in such a way as to attempt connection to the second communication line until the connection is successful.

As described above, the information to be required when configuring the alternative communication channel may be information for connecting to the second communication line. Further, such information may be information for operating in place of the relay device 110 on the second communication line.

Next, details of the respective functional blocks in the management device 310 will be described.

The failure detection unit 311 detects a failure on the first communication line. A known technology is applicable to failure detection. Alternatively, the failure detection unit 311 may acquire information indicating that a failure is detected on the first communication line as an input.

In response to failure detection on the first communication line, the communication-channel-configuration control unit 312 controls the relay device 110 and the auxiliary relay device 210 in such a way as to configure the alternative communication channel by using the third communication line and the auxiliary relay device 210. Specifically, the communication-channel-configuration control unit 312 may previously collect from the relay device 110 information to be required by the auxiliary relay device 210 when configuring the alternative communication channel, and store the information. Then, in this case, in response to failure detection on the first communication line, the communication-channel-configuration control unit 312 may transmit the collected information to the auxiliary relay device 210 and set the information.

For example, as described above, the information to be collected may be information for connecting to the second communication line. In this case, the communication-channel-configuration control unit 312 sets the information for connecting to the second communication line to the fourth communication unit 212 in the auxiliary relay device 210. Then, when the fourth communication unit 212 is connected to the second communication line, the relay device 110 is connectable to the server 91 through the second communication line, the auxiliary relay device 210, and the third communication line, by using the second communication unit 112. In other words, the relay device 110 is able to continue relaying data between the server 91 and the device 92, by using the alternative communication channel including the auxiliary relay device 210 and the third communication line.

Further, as described above, the information to be collected may be information for operating as a replacement of the relay device 110 on the second communication line. In this case, the communication-channel-configuration control unit 312 sets the information for operating as a replacement of the relay device 110 on the second communication line to the respective units which are included in the auxiliary relay device 210 and include at least the fourth communication unit 212. Then, when the fourth communication unit 212 is connected to the second communication line, the auxiliary relay device 210 is able to transmit and receive data to and from the device 92 through the second communication line, without passing through the relay device 110. In other words, the auxiliary relay device 210 is able to relay data between the server 91 and the device 92 in place of the relay device 110, by using the alternative communication channel including the auxiliary relay device 210 and the third communication line.

The delivery control unit 313 performs control in such a way that the auxiliary relay device 210 is delivered to a location where the fourth communication unit 212 is connectable to the second communication line. For the delivery control, a system provided by an external delivery company may be used, or a device capable of moving autonomously or semi-autonomously may be used. Alternatively, the delivery control unit 313 is able to control delivery by using a known technology of including an interface accepting information indicating delivery details of articles as an input and delivering then articles in accordance with input information.

Specifically, the delivery control unit 313 outputs information indicating that the auxiliary relay device 210 is delivered from an installation location of the auxiliary relay device 210 to an installation location of the relay device 110, to a system or a device used for controlling the delivery. Herewith, the auxiliary relay device 210 is delivered from the installation location of the auxiliary relay device 210 to the installation location of the relay device 110.

An operation of the information processing system 1 configured as described above will be described with reference to drawings.

Figure 3:
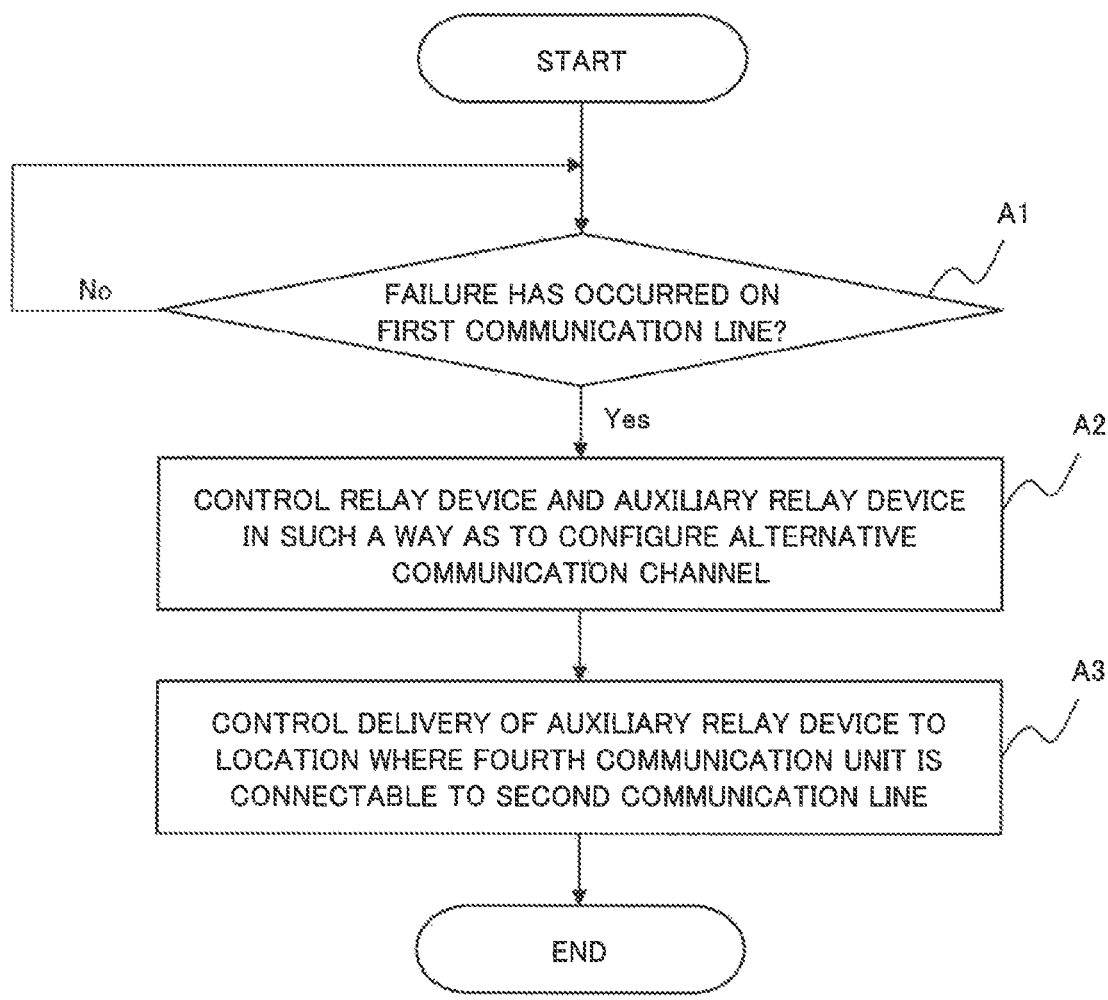
FIG. 3 is a flowchart illustrating an operation of a management device according to the first example embodiment of the present invention.

First, FIG. 3 illustrates an operation of the management device 310.

It is assumed that the communication-channel-configuration control unit 312 previously collects from the communication channel configuration unit 114 in the relay device 110 information to be required by the auxiliary relay device 210 when configuring the alternative communication channel, and stores the information.

In FIG. 3, first, the failure detection unit 311 in the management device 310 determines whether or not a failure has occurred on the first communication line (Step A1).

When a failure has not occurred (No in Step A1), the failure detection unit 311 periodically repeats the processing in Step A1.

On the other hand, a case that a failure has occurred (Yes in Step A1) will be described. In this case, the communication-channel-configuration control unit 312 controls the relay device 110 and the auxiliary relay device 210 in such a way as to configure the alternative communication channel being an alternative to the first communication line, by using the third communication line and the auxiliary relay device 210 (Step A2).

Specifically, for example, the communication-channel-configuration control unit 312 may transmit to the auxiliary relay device 210 information which is previously collected from the communication channel configuration unit 114 in the relay device 110 and stored, and which is required when configuring the alternative communication channel.

Next, the delivery control unit 313 controls in such a way that the auxiliary relay device 210 is delivered to a location where the fourth communication unit 212 is connectable to the second communication line (Step A3).

Herewith, the auxiliary relay device 210 is delivered to a location where the fourth communication unit 212 is connectable to the second communication line.

Thus, the management device 310 ends the operations.

Figure 4:
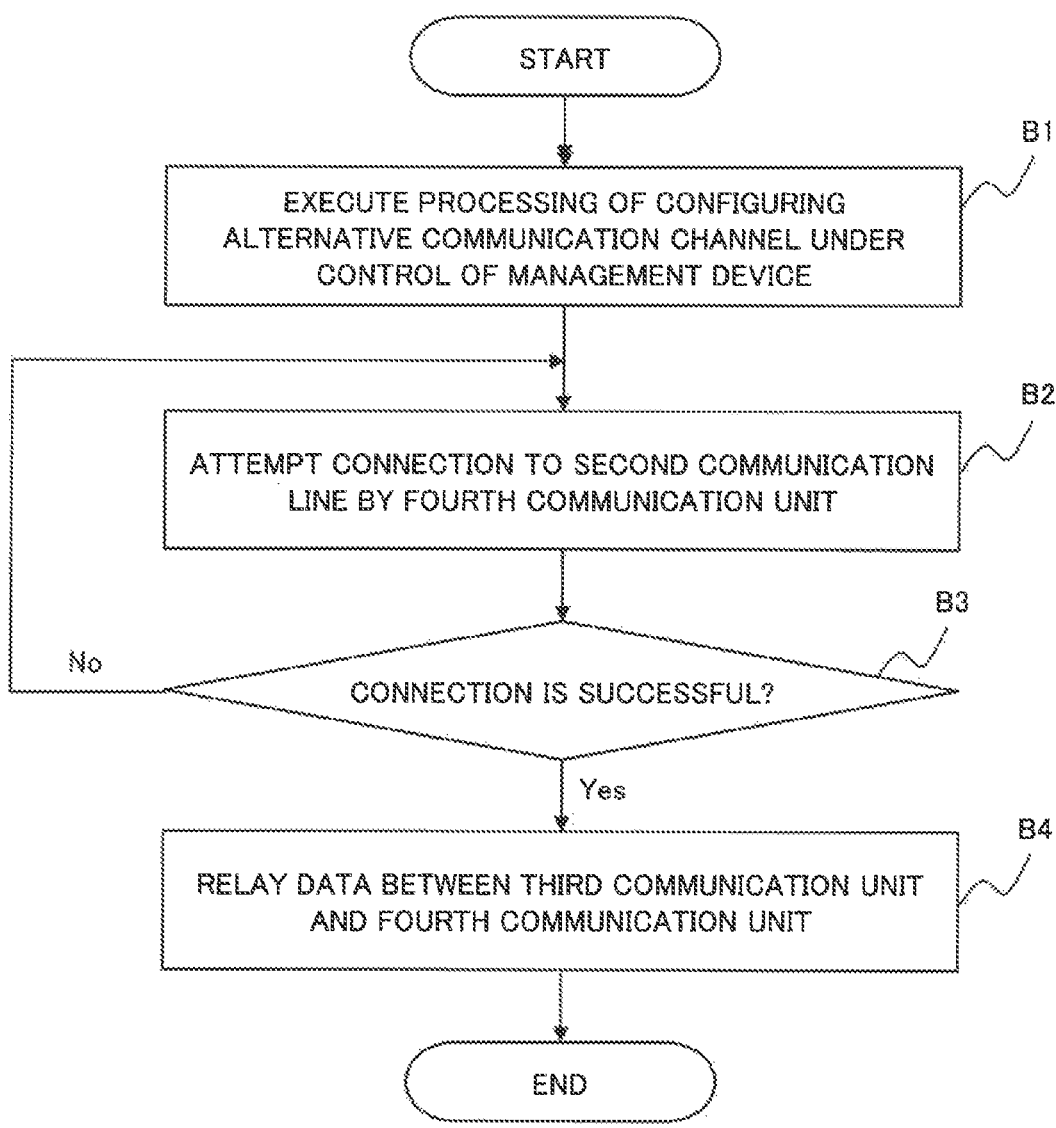
FIG. 4 is a flowchart illustrating an operation of an auxiliary relay device according to the first example embodiment of the present invention.

Next, FIG. 4 illustrates an operation of the auxiliary relay device 210.

In FIG. 4, first, the auxiliary-communication-channel configuration unit 214 performs processing of configuring the alternative communication channel, based on control by the communication-channel-configuration control unit 312 in the management device 310 (Step B1).

Specifically, the auxiliary-communication-channel configuration unit 214 sets information to be required when configuring the alternative communication channel, the information being received from the communication-channel-configuration control unit 312 in the management device 310, to the respective units including at least the fourth communication unit 212.

Next, the auxiliary-communication-channel configuration unit 214 controls the fourth communication unit 212 in such a way as to attempt connection to the second communication line (Step B2).

When connection to the second communication line by the fourth communication unit 212 is not successful (No in Step B3), the auxiliary-communication-channel configuration unit 214 controls the fourth communication unit 212 in such a way as to repeat Step B2.

On the other hand, a case of connection to the second communication line by the fourth communication unit 212 being successful (Yes in Step B3) will be described. In this case, the auxiliary communication processing unit 213 performs processing of relaying data between the third communication unit 211 and the fourth communication unit 212 (Step B4).

Additionally, a case of information for connecting to the second communication line being set in Step B1 as information to be required when configuring the alternative communication channel will be considered. In this case, by execution of Step B4, the relay device 110 is able to communicate with the server 91 through the auxiliary relay device 210 connected to the second communication line and the third communication line (that is, the alternative communication channel). Then, the relay device 110 continues relaying data between the server 91 and the device 92.

Alternatively, a case of information for operating in place of the relay device 110 on the second communication line being set in Step B1 as information to be required when configuring the alternative communication channel will be considered. In this case, in Step B4, the auxiliary communication processing unit 213 relays data between the third communication unit 211 communicating with the server 91 and the fourth communication unit 212 communicating with the device 92 through the second communication line, without passing through the relay device 110. Accordingly, the auxiliary relay device 210 continues relaying data between the server 91 and the device 92 in place of the relay device 110.

Thus, in the information processing system 1, even when a failure occurs on the first communication line, relaying data between the server 91 and the device 92 is continued by using the alternative communication channel including the auxiliary relay device 210 and the third communication line.

The above concludes the description of the operation of the information processing system 1.

Next, effects of the first example embodiment of the present invention will be described.

The information processing system according to the first example embodiment of the present invention is able to improve availability in a widely distributed information processing system, without providing an individual relay device with an auxiliary communication line that provides redundancy for a communication line between the relay device and a server.

The reason will be described. According to the present example embodiment, a relay device includes a first communication unit being connected to a first communication line and communicating with a server, and a second communication unit being connected to a second communication line and communicating with a device, and relays data between the first communication unit and the second communication unit. Further, an auxiliary relay device includes a third communication unit that may be connected to a third communication line and perform communication with the server, and a fourth communication unit configurable to be connected to the second communication line and perform communication, and is configured to be able to relay data between the third communication unit and the fourth communication unit. When a failure detection unit in a management device detects occurrence of a failure on the first communication line, a communication-channel-configuration control unit controls the relay device and the auxiliary relay device in such a way as to configure the alternative communication channel being an alternative to the first communication line. The alternative communication channel is configured to include the third communication line and the auxiliary relay device. Then, in accordance with control by the communication-channel-configuration control unit, a communication channel configuration unit in the relay device and an auxiliary-communication-channel configuration unit in the auxiliary relay device perform processing of configuring the alternative communication channel. Further, a delivery control unit in the management device performs control in such a way that the auxiliary relay device is delivered to a location where the fourth communication unit is connectable to the second communication line. The auxiliary-communication-channel configuration unit in the auxiliary relay device controls the fourth communication unit in such a way as to attempt connection to the second communication line at the relay device. When the fourth communication unit is connected to the second communication line, an auxiliary communication processing unit in the auxiliary relay device relays data between the third communication unit communicating with the server and the fourth communication unit communicating with the device (through or bypassing the relay device).

Herewith, the present example embodiment does not need to provide, for each relay device, an auxiliary communication line providing redundancy for the first communication line connected to the server. For example, even when a relay device is installed at each location where the device is used, the present example embodiment has only to put at least one auxiliary relay device on standby. Consequently, even when a failure occurs on the first communication line connected to the server at any relay device, the present example embodiment is able to configure the alternative communication channel by using the third communication line and the auxiliary relay device.

Further, as described above, when a failure occurs on the first communication line connected to the server at the relay device, the present example embodiment automatically establishes the alternative communication channel. Consequently, the present example embodiment is able to restore the data relay processing, without requiring an operator with a technical knowledge about a communication channel configuration.

Second Example Embodiment

Next, a second example embodiment of the present invention will be described in detail with reference to drawings. In each drawing referred to in the description of the present example embodiment, a configuration identical to and a step operating similarly to those according to the first example embodiment of the present invention are respectively given reference signs identical to those in the first example embodiment, and detailed description in the present example embodiment is omitted.

Figure 5:
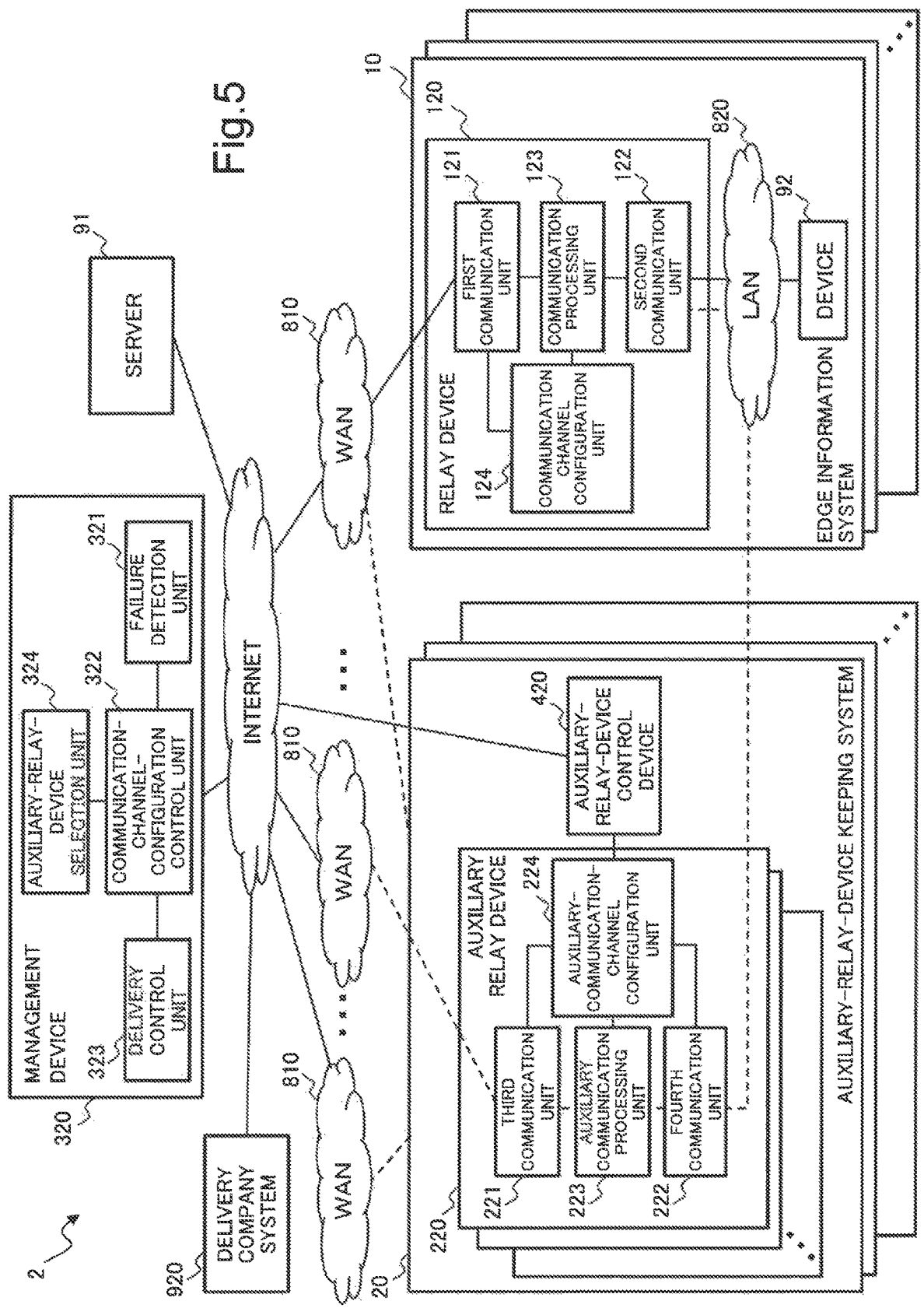
FIG. 5 is a block diagram illustrating a configuration of an information processing system according to a second example embodiment of the present invention.

First, a configuration of an information processing system 2 according to the second example embodiment of the present invention will be described by using FIG. 5. In FIG. 5, the information processing system 2 differs from the information processing system 1 according to the first example embodiment of the present invention in including a relay device 120 in place of the relay device 110, an auxiliary relay device 220 in place of the auxiliary relay device 210, and a management device 320 in place of the management device 310. Additionally, the information processing system 2 differs in including an auxiliary-relay-device control device 420. Additionally, the information processing system 2 differs in being connected to a delivery company system 920. It is assumed that the relay device 120 and the device 92 are included in an edge information system 10, according to the present example embodiment. It is further assumed that the auxiliary relay device 220 and the auxiliary-relay-device control device 420 constitute an auxiliary-relay-device keeping system 20.

In FIG. 5, a solid line connecting rectangles representing functional blocks indicates that the functional blocks are communicable during normal operation of the information processing system 2. Further, a broken line connecting rectangles representing functional blocks indicates that the functional blocks may be connected when a failure occurs on a first communication line.

Further, a number of components illustrated in FIG. 5 is an example and is not limited to the illustrated number. For example, while FIG. 5 includes three edge information systems 10, a number of edge information systems 10 included in the information processing system 2 is not limited. Further, while one relay device 120 is illustrated in each edge information system 10, a number of relay devices 120 included in one edge information system 10 is not limited. Further, while three auxiliary-relay-device keeping systems 20 are illustrated, a number of auxiliary-relay-device keeping systems 20 included in the information processing system 2 is not limited. Further, while three auxiliary relay devices 220 are illustrated in each auxiliary-relay-device keeping system 20, a number of auxiliary relay devices 220 included in one auxiliary-relay-device keeping system 20 is not limited. Further, while one auxiliary-relay-device control device 420 is illustrated in each auxiliary-relay-device keeping system 20, a number of auxiliaryrelay-device control devices 420 included in one auxiliary-relay-device keeping system 20 is not limited. Further, while one management device 320 is illustrated, a number of management devices 320 included in the information processing system 2 is not limited. Further, while one server 91 is illustrated, a number of servers 91 connectable to the information processing system 2 is not limited. Further, while one device 92 is illustrated in each edge information system 10, a number of devices 92 connectable to the relay device 120 in one edge information system 10 is not limited. Further, while one delivery company system 920 is illustrated, a number of delivery company systems 920 connectable to the information processing system 2 is not limited.

Further, as illustrated in FIG. 5, it is assumed that each of the management device 320, the server 91, the auxiliary-relay-device control device 420, and the delivery company system 920 is connected to the Internet. Each of the components may be connected to the Internet through an unillustrated WAN, LAN, or the like.

Further, as illustrated in FIG. 5, the relay device 120 is connected to the Internet through any one of n types (where n is an integer greater than or equal to 2) of WAN communication lines 810. Further, the auxiliary relay device 220 is configured in such a way as to be connected to the Internet through at least one of the WAN communication lines 810. The WAN communication line 810 is hereinafter also described as a WAN 810. The respective WANs 810 are different types of WANs connected to the Internet. For example, each WAN 810 may be composed of any one of a 5th generation (5G) network, a Long Term Evolution (LTE) network, a 3rd generation (3G) network, an optical fiber network, and a fiber to the home (FTTH) network, or a combination thereof. However, a communication line constituting the WAN 810 is not limited.

The WAN 810 connecting the relay device 120 to the Internet constitutes an example embodiment of the first communication line according to the present invention. Further, the WAN 810 connecting the auxiliary relay device 220 to the Internet constitutes an example embodiment of the third communication line according to the present invention. The WAN 810 connecting the relay device 120 to the Internet is hereinafter also described as a WAN 810-$i$ (where i is any one of integers 1 to n). Further, the WAN 810 connecting the auxiliary relay device 220 to the Internet is also described as a WAN 810-$j$ (where j is any one of integers 1 to n). Note that i and j may be identical or different. However, the WAN 810-$j$ applied as the third communication line constituting the alternative communication channel when a failure occurs in the WAN 810-$i$ as the first communication line is a line different from the WAN 810-$i$.

It is assumed that the relay device 120 in the edge information system 10 uses the WAN 810-$i$ under a line contract with a communication service provider operating the WAN 810-$i$. It is further assumed that the auxiliary relay device 220 in the auxiliary-relay-device keeping system 20 uses the WAN 810-$j$ under a line contract with a communication service provider operating the WAN 810-$j$.

Further, a case of a plurality of relay devices 120 being included in one edge information system 10 will be considered. In this case, the WAN 810-$i$ used by the certain relay device 120 may be similar to at least one other relay device 120 or may be different. Further, a case of a plurality of edge information systems 10 being included in the information processing system 2 will be considered. In this case, the WAN 810-$i$ used by the relay device 120 included in the certain edge information system 10 may be similar to at least one other relay device 120 included in at least one other edge information system 10, or may be different.

Further, a case of a plurality of auxiliary relay devices 220 being included in the auxiliary-relay-device keeping system 20 will be considered. In this case, the WAN 810-$j$ that may be used by the certain auxiliary relay device 220 may be identical to at least one other auxiliary relay device 220, or may be different. Further, a case of a plurality of auxiliary-relay-device keeping systems 20 being included in the information processing system 2 will be considered. In this case, the WAN 810-$j$ that may be used by the auxiliary relay device 220 included in the certain auxiliary-relay-device keeping system 20 may be identical to at least one other auxiliary relay device 220 included in at least one other auxiliary-relay-device keeping system 20, or may be different.

Further, the relay device 120 in each edge information system 10 is connected to the device 92 through a LAN 820. The LAN 820 constitutes an example embodiment of the second communication line according to the present invention.

Details of the components constituting the information processing system 2 and the components connected to the information processing system 2 will be described below.

First, details of the server 91 will be described.

As described in the first example embodiment of the present invention, the server 91 is a device performing information processing for providing a service. In the present example embodiment, the server 91 is placed in a cloud and is connected to the Internet. Further, it is assumed that, for example, the server 91 is a front-end web server in the present example embodiment. Further, in this case, the server 91 may perform the information processing in cooperation with a database server, a storage server, or a back-end server (none illustrated). The device 92 is a device using a service provided by the server 91.

Next, details of the edge information system 10 will be described.

The edge information system 10 includes one or more devices 92 using the server 91, the relay device 120, and the LAN 820. For example, the edge information system 10 is placed in a building, a site, or the like of a system user, and is connected to the WAN 810-$i$.

The LAN 820 is a network connecting the device 92 to the relay device 120. For example, the LAN 820 may be configured with a wireless LAN, Bluetooth®, or Zigbee®. However, the LAN 820 is not limited to the above.

As described in the first example embodiment of the present invention, the device 92 is a device using the server 91. For example, the device 92 may be a user terminal including an input and output device. In this case, the device 92 transmits an input from a user to the server 91 and outputs a response from the server 91 to the user. Further, for example, the device 92 may be a sensor device including a sensor and a manipulator. In this case, the device 92 transmits information read from the sensor to the server 91 and activates the manipulator in accordance with an instruction received from the server 91. The edge information system 10 may include a plurality of different types of devices 92.

The relay device 120 is a relay device relaying data between the WAN 810-$i$ and the LAN 820. The relay device 120 transmits data received from the device 92 through the LAN 820 to the server 91 through the WAN 810-$i$. Further, the relay device 120 transmits data received from the server 91 through the WAN 810-$i$ for the device 92 to the device 92 through the LAN 820. When relaying data, the relay device 120 may perform network address translation (NAT) processing and network address port translation (NAPT) processing. Further, the relay device 120 may perform primary processing on data from the device 92.

Specifically, the relay device 120 includes a first communication unit 121, a second communication unit 122, a communication processing unit 123, and a communication channel configuration unit 124.

The first communication unit 121 is connected to the WAN 810-*i*, and transmits and receives data.

The second communication unit 122 is connected to the LAN 820, and transmits and receives data. For example, the second communication unit 122 has a function as a master unit (access point) in a wireless LAN, Bluetooth, or Zigbee, and reports an identifier of the LAN 820. Further, the second communication unit 122 performs authentication and authorization of a slave unit requesting connection to the LAN 820.

The communication processing unit 123 performs processing of relaying data between the first communication unit 121 and the second communication unit 122. For example, the communication processing unit 123 is configured to include a Transmission Control Protocol (TCP)/Internet Protocol (IP) stack. The communication processing unit 123 uses an IP address of the relay device 120 in the WAN 810-*i* as an IP address for the first communication unit 121. Further, the communication processing unit 123 uses an IP address of a default gateway in the WAN 810-*i* as a next hop in a default route for communication with the server 91. Further, the communication processing unit 123 may execute NAT processing and NAPT processing on data to be transferred.

The communication channel configuration unit 124 configures the alternative communication channel using the third communication line and the auxiliary relay device 220, and performs processing of switching a communication channel used by the communication processing unit 123 to the alternative communication channel, under control of the management device 320. Specifically, in response to a request from the management device 320, the communication channel configuration unit 124 transmits to the management device 320 information for connecting to the LAN 820. The information for connecting to the LAN 820 is hereinafter also described as connection information to the LAN 820. Details of the connection information will be described later. Further, when the auxiliary relay device 220 is connected to the LAN 820, the communication channel configuration unit 124 performs switching processing as follows. That is, the communication channel configuration unit 124 switches a next hop of a default route used for communication with the server 91 by the communication processing unit 123 from the default gateway of the WAN 810-*i* to a fourth communication unit 222 in the auxiliary relay device 220 to be described later.

The auxiliary-relay-device keeping system 20 is a system keeping the auxiliary relay device 220. The auxiliary-relay-device keeping system 20 is placed at a location from which the auxiliary relay device 220 may be delivered to a placement location of the edge information system 10. For example, the auxiliary-relay-device keeping system 20 is placed in the same municipality as the edge information system 10. However, a placement location of the auxiliary-relay-device keeping system 20 is not limited to the above.

Next, details of the auxiliary-relay-device keeping system 20 will be described.

As illustrated in FIG. 5, the auxiliary-relay-device keeping system 20 is configured to include the auxiliary-relay-device control device 420 and one or more auxiliary relay devices 220.

The auxiliary relay device 220 is a device providing the edge information system 10 with an auxiliary WAN communication line. The auxiliary-relay-device keeping system 20 may include a plurality of different types of auxiliary relay devices 220. Further, the auxiliary relay device 220 may be placed at the physically same location as the auxiliary-relay-device keeping system 20 in an initial state. However, even in that case, when a failure is detected in the WAN 810-*i* being the first communication line, the auxiliary relay device 220 may be placed at a location physically different from the auxiliary-relay-device keeping system 20. For example, the auxiliary relay device 220 may be composed of a communication device generally called a mobile router that can be battery operated.

As illustrated in FIG. 5, the auxiliary relay device 220 includes a third communication unit 221, the fourth communication unit 222, an auxiliary communication processing unit 223, and an auxiliary-communication-channel configuration unit 224.

The third communication unit 221 is connected to the WAN 810-*j*, and transmits and receives data.

The fourth communication unit 222 may be configured to be connected to the LAN 820 and perform communication.

The auxiliary communication processing unit 223 performs processing of relaying data between the third communication unit 221 and the fourth communication unit 222. For example, the auxiliary communication processing unit 223 is configured to include a TCP/IP stack. The auxiliary communication processing unit 223 may execute NAT processing and NAPT processing on relayed data.

The auxiliary-communication-channel configuration unit 224 configures the alternative communication channel by using the third communication line and the auxiliary relay device 220, under control of the management device 320, and performs processing of connecting the fourth communication unit 222 to the second communication line. Specifically, the auxiliary-communication-channel configuration unit 224 performs setting of connection information to the LAN 820 on the fourth communication unit 222. Further, the auxiliary-communication-channel configuration unit 224 performs setting for data transfer between the relay device 120 and the server 91 on the auxiliary communication processing unit 223.

The auxiliary-relay-device control device 420 is a device controlling the auxiliary relay device 220 under control of the management device 320. The auxiliary-relay-device control device 420 is connected to the Internet. For example, the auxiliary-relay-device control device 420 is connected to the auxiliary relay device 220 through a network such as a LAN or a WAN. The auxiliary relay device 220 may be turned off during normal operation. In order to handle such a case, for example, the auxiliary-relay-device control device 420 is configured to be able to give a physical action including power supply, power on/off, and reset on the auxiliary relay device 220 by controlling a physical device such as a robot.

Next, details of the management device 320 will be described.

The management device 320 is a device managing and configuration-controlling the auxiliary relay device 220 kept in the auxiliary-relay-device keeping system 20. For example, the management device 320 is placed in a cloud and is connected to the Internet.

As illustrated in FIG. 5, the management device 320 includes a failure detection unit 321, a communication-channel-configuration control unit 322, a delivery control unit 323, and an auxiliary-relay-device selection unit 324. The auxiliary-relay-device selection unit 324 constitutes an example embodiment of part of the delivery control unit according to the present invention.

The failure detection unit 321 monitors a state of the WAN 810-$i$ used by the relay device 120 in the edge information system 10. Then, when detecting a failure, the failure detection unit 321 sends a notification to the communication-channel-configuration control unit 322. For example, the failure detection unit 321 may monitor the state of the WAN 810-$i$ by exchanging a ping request packet and a ping response packet with the relay device 120. Alternatively, for example, the failure detection unit 321 may monitor the state of the WAN 810-$i$ by exchanging keep-alive packets with the relay device 120.

When a failure is detected in the WAN 810-$i$ by the failure detection unit 321, the communication-channel-configuration control unit 322 selects the auxiliary relay device 220 constituting the alternative communication channel out of a plurality of the auxiliary relay devices 220, by using the auxiliary-relay-device selection unit 324 to be described later.

Further, the communication-channel-configuration control unit 322 controls the relay device 120 and the auxiliary relay device 220 in such a way that the relay device 120, a failure being detected in the WAN 810-$i$ used by the relay device 120, is connected to the server 91 through the selected auxiliary relay device 220. Specifically, the communication-channel-configuration control unit 322 acquires connection information to the LAN 820 from the communication channel configuration unit 124 in the relay device 120 and stores the connection information being associated with information indicating the relay device 120 (for example, an identifier of the relay device 120). Then, the communication-channel-configuration control unit 322 transmits stored connection information related to the relay device 120, a failure being detected in a WAN 810-$i$ used by the relay device 120, to the auxiliary-communication-channel configuration unit 224 in the selected auxiliary relay device 220, and makes the auxiliary-communication-channel configuration unit 224 set the connection information.

For example, the communication-channel-configuration control unit 322 may receive from the communication channel configuration unit 124 the following in part or in whole, as connection information to the LAN 820. Then, the communication-channel-configuration control unit 322 stores the received connection information being associated with information indicating the relay device 120.

An identifier of the LAN 820 (for example, a service set identifier [SSID] of a wireless LAN)

Authentication information (an ID, a password, a passphrase, and the like) required for connection to the LAN 820

Media information (a channel, a modulation system, and the like) of the LAN 820

An IP address of the relay device 120 in the LAN 820

An IP address usable in the LAN 820

Further, for each relay device 120, the communication-channel-configuration control unit 322 may generate information for mutual authentication of the relay device 120 and the auxiliary relay device 220, and protection of communication contents. For example, such information may be a common key to be used in mutual authentication of the relay device 120 and the auxiliary relay device 220, or the like.

For example, the common key may be a byte string generated by a random number generator. Then, the communication-channel-configuration control unit 322 may transmit a stored common key related to the relay device 120, a failure being detected in a WAN 810-$i$ used by the relay device 120, to the selected auxiliary relay device 220.

Connection information to the LAN 820, and information for mutually authenticating the relay device 120 and the auxiliary relay device 220, and protecting communication contents, the pieces of information being collected or generated by the communication-channel-configuration control unit 322, relate to one example embodiment of "information used when the fourth communication unit is connected to the second communication line" according to the present invention.

The auxiliary-relay-device selection unit 324 selects the auxiliary relay device 220, based on a characteristic of the relay device 120, a characteristic of the auxiliary relay device 220, or a characteristic of the failure.

For example, a characteristic (for example, a type, a capability, a communicable range, a line type, or contract details) of a WAN 810-$i$ (in which a failure is detected) used by the first communication unit 121 is cited as the characteristic of the relay device 120. Further, a characteristic (for example, a type, a capability, a communicable range, or a line type) of the LAN 820 being used by the second communication unit 122 is cited as the characteristic of the relay device 120. Further, positional information indicating a location where the relay device 120 is installed is cited as the characteristic of the relay device 120.

Further, for example, a characteristic (for example, a type, a capability, a communicable range, a line type, or contract details) of the WAN 810-$j$ available to the third communication unit 221 is cited as the characteristic of the auxiliary relay device 220. Further, a characteristic (a type, a capability, a communicable range, a line type, or the like) of the LAN 820 available to the fourth communication unit 222 is cited as the characteristic of the auxiliary relay device 220. Further, positional information indicating a location where the auxiliary relay device 220 is installed is cited as the characteristic of the auxiliary relay device 220. Further, a battery-operable time of the auxiliary relay device 220, or the like is cited as the characteristic of the auxiliary relay device 220.

Further, for example, a source of the failure, failure details, or the like is cited as the characteristic of the failure.

The auxiliary-relay-device selection unit 324 stores the aforementioned information indicating the characteristic, the information being associated with information indicating each relay device 120 and information indicating each auxiliary relay device 220. The auxiliary-relay-device selection unit 324 may acquire and store previously input information as the information indicating the characteristics of the relay device 120 or the auxiliary relay device 220. Alternatively, the auxiliary-relay-device selection unit 324 may acquire and store information transmitted from the auxiliary-relay-device control device 420 or the auxiliary relay device 220 as the information indicating the characteristic of the relay device 120 or the auxiliary relay device 220. In that case, the auxiliary-relay-device selection unit 324 may store information to be required for communication with the auxiliary-relay-device control device 420 (an IP address of the auxiliary-relay-device control device 420, or the like).

The delivery control unit 323 outputs to the delivery company system 920 delivery instruction information instructing delivery of the auxiliary relay device 220 selected by the auxiliary-relay-device selection unit 324 from the auxiliary-relay-device keeping system 20 to the edge information system 10. For example, the delivery control unit 323 stores delivery company information related to each delivery company, the information being associated with information indicating the delivery company system 920. Further, in this case, the delivery control unit 323 may select the delivery company system 920 being an output destination of delivery instruction information, based on delivery company information, a location of the auxiliary relay device 220, and a location of the relay device 120. Additionally, when an estimation processing result related to a predetermined value can be acquired from the delivery company system 920, the delivery control unit 323 may select the delivery company system 920 being an output destination of the delivery instruction information, by also taking the estimation processing result into consideration. The following information is cited as an example of delivery company information. The delivery control unit 323 may acquire and store previously input information as such delivery company information. Alternatively, the delivery control unit 323 may acquire and store information transmitted from the delivery company system 920 as such delivery company information.

An identifier of the delivery company system 920: the identifier of the delivery company system 920 may be an identifier of the delivery company.
Information for connecting to the delivery company system 920: a communication address of a server accepting the delivery instruction and the like
A base location of the delivery company providing the delivery company system 920
A delivery means (a truck, a motorcycle, or the like)
A provided service (special delivery, regular delivery, or the like)
Information related to a delivery charge
Information related to a time required for delivery The delivery company system 920 is a system delivering the auxiliary relay device 220. For example, the delivery company system 920 may be a system composed of a server of a logistics company and a network. In this case, for example, the delivery company system 920 may be configured for each delivery company.

Further, for example, the delivery company system 920 includes an interface acquiring delivery instruction information as an input. Further, the delivery company system 920 performs delivery processing for delivering a specified article at a specified location to another specified location, in accordance with a delivery instruction indicated by the input delivery instruction information. For example, the delivery company system 920 may execute processing of printing information included in delivery instruction information on a delivery slip, as part of the delivery processing. The delivery slip is a slip delivered along with a delivered article. The delivery company system 920 may have a function of performing estimation processing of an amount, a required time, and the like before performing the actual delivery processing.

An operation of the information processing system 2 configured as described above will be described in detail with reference to drawings. The operations of the information processing system 2 will be described divided into three parts: (A) initial registration processing; (B) WAN monitoring processing; and (C) alternative communication channel configuration processing.

(A) Initial Registration Processing

First, by using a sequence diagram in FIG. 6, the initial registration processing of registering information of the edge information system 10 in the management device 320 will be described. For example, the operation is started when the edge information system 10 is newly installed or when information related to the WAN 810-$i$ or the LAN 820 used by the edge information system 10 is updated.

Figure 6:
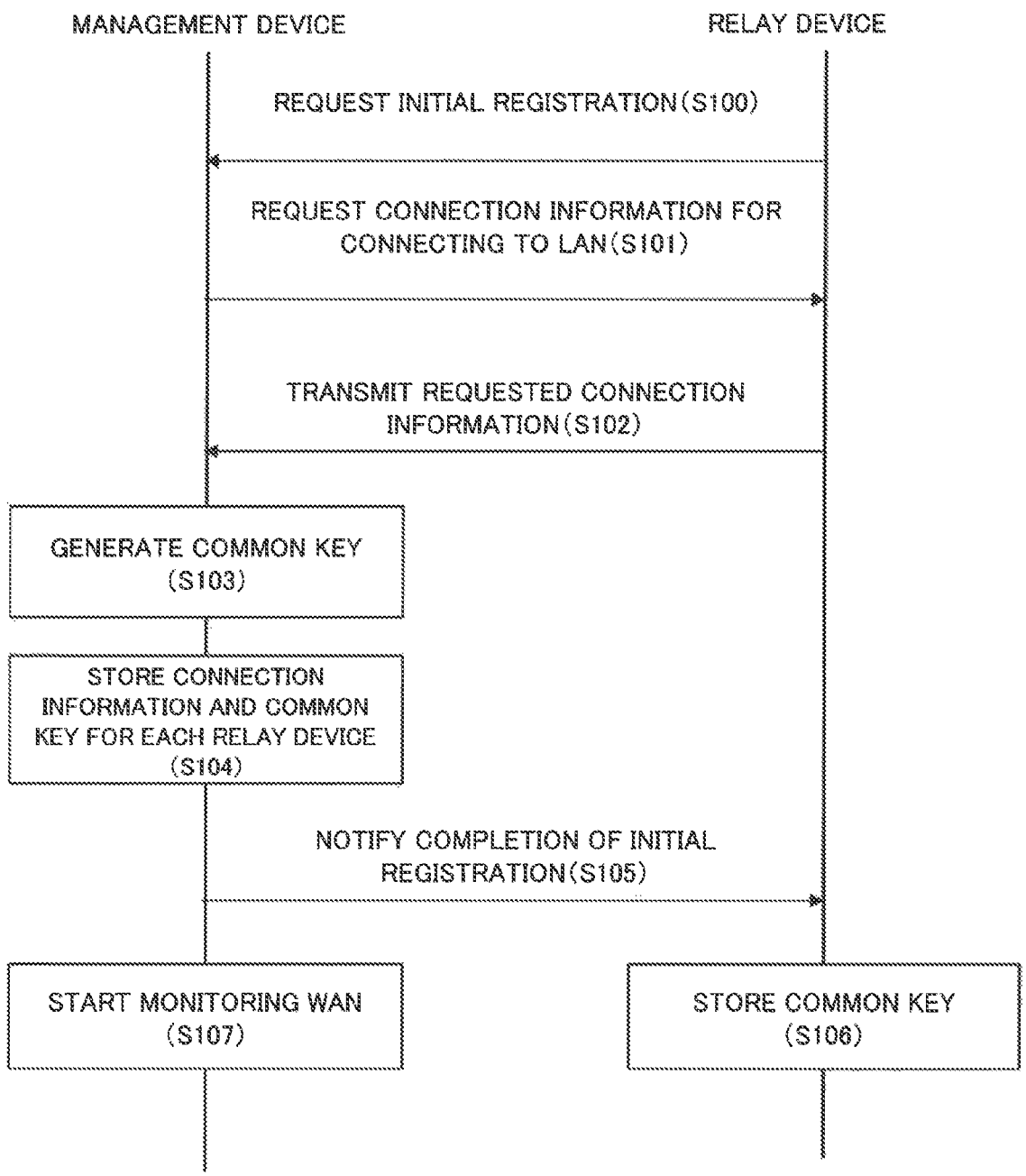
FIG. 6 is a sequence diagram illustrating initial registration processing in the information processing system according to the second example embodiment of the present invention.

In FIG. 6, first, the communication channel configuration unit 124 in the relay device 120 requests initial registration to the management device 320 (Step S100). For example, the communication channel configuration unit 124 may transmit to the management device 320 information indicating a request, with an identifier and an installation location of the edge information system 10, an identifier and an installation location of the relay device 120, an IP address assigned to the relay device 120 in the WAN 810-$i$, and the like. For example, information previously input by an installer of the relay device 120 may be applied to information other than the IP address in the WAN 810-$i$ within the aforementioned information. Further, the information related to the IP address in the WAN 810-$i$ is acquirable from the first communication unit 121. The communication channel configuration unit 124 may use previously input information as information required for communication with the management device 320 (for example, a communication address of the management device 320).

Next, the communication-channel-configuration control unit 322 in the management device 320 requests connection information to the LAN 820 used by the relay device 120 being a request source to the LAN 820 (Step S101).

Next, the communication channel configuration unit 124 in the relay device 120 transmits to the management device 320 connection information to the LAN 820 connected to the relay device 120 (Step S102).

Next, the communication-channel-configuration control unit 322 in the management device 320 generates a common key for use in mutual authentication of the relay device 120 and the auxiliary relay device 220, or the like (Step S103). The generated common key is used in (C) alternative communication channel configuration processing to be described later.

Next, the communication-channel-configuration control unit 322 stores the information related to the relay device 120 acquired in Steps S100 and S102, and the common key generated in Step S103, which are associated with an identifier of the relay device 120 or the like (Step S104).

Next, the communication-channel-configuration control unit 322 notifies the relay device 120 of completion of the initial registration (Step S105). Further, at that time, the communication-channel-configuration control unit 322 includes the common key generated in Step S103 into the notification.

Next, the communication channel configuration unit 124 in the relay device 120 stores the received common key (Step S106)

Next, the communication-channel-configuration control unit 322 in the management device 320 instructs the failure detection unit 321 to start monitoring the WAN 810-$i$ used by the relay device 120 for which initial registration is completed (Step S107). At that time, the communication-channel-configuration control unit 322 may instruct the start of monitoring, specifying, as a monitoring target, an IP address of the relay device 120 in the WAN 810-$i$ stored in Step S104.

The above concludes the description of the initial registration processing in the information processing system 2.

(B) WAN Monitoring Processing

Figure 7:
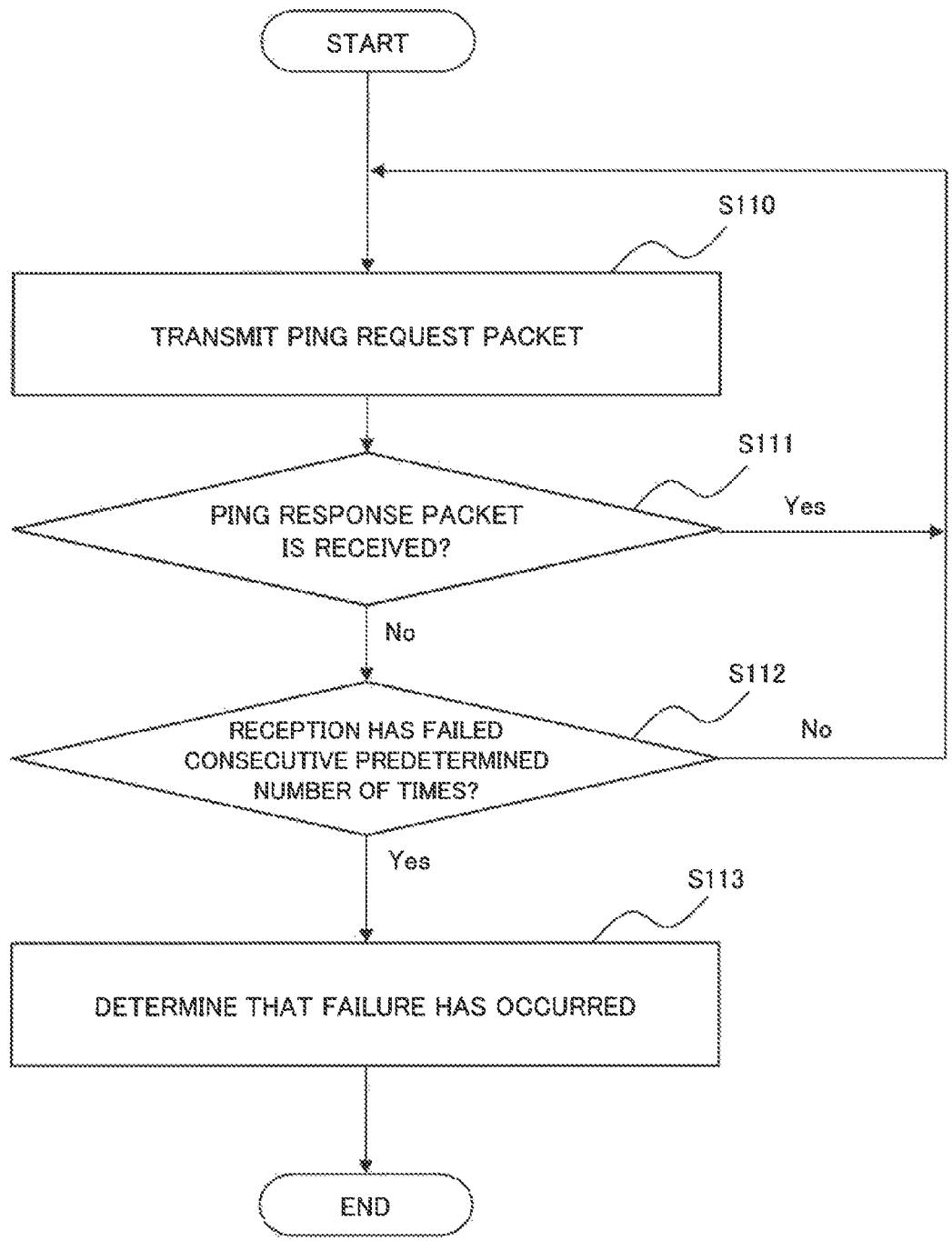
FIG. 7 is a flowchart illustrating WAN monitoring processing in the information processing system according to the second example embodiment of the present invention.
Figure 8:
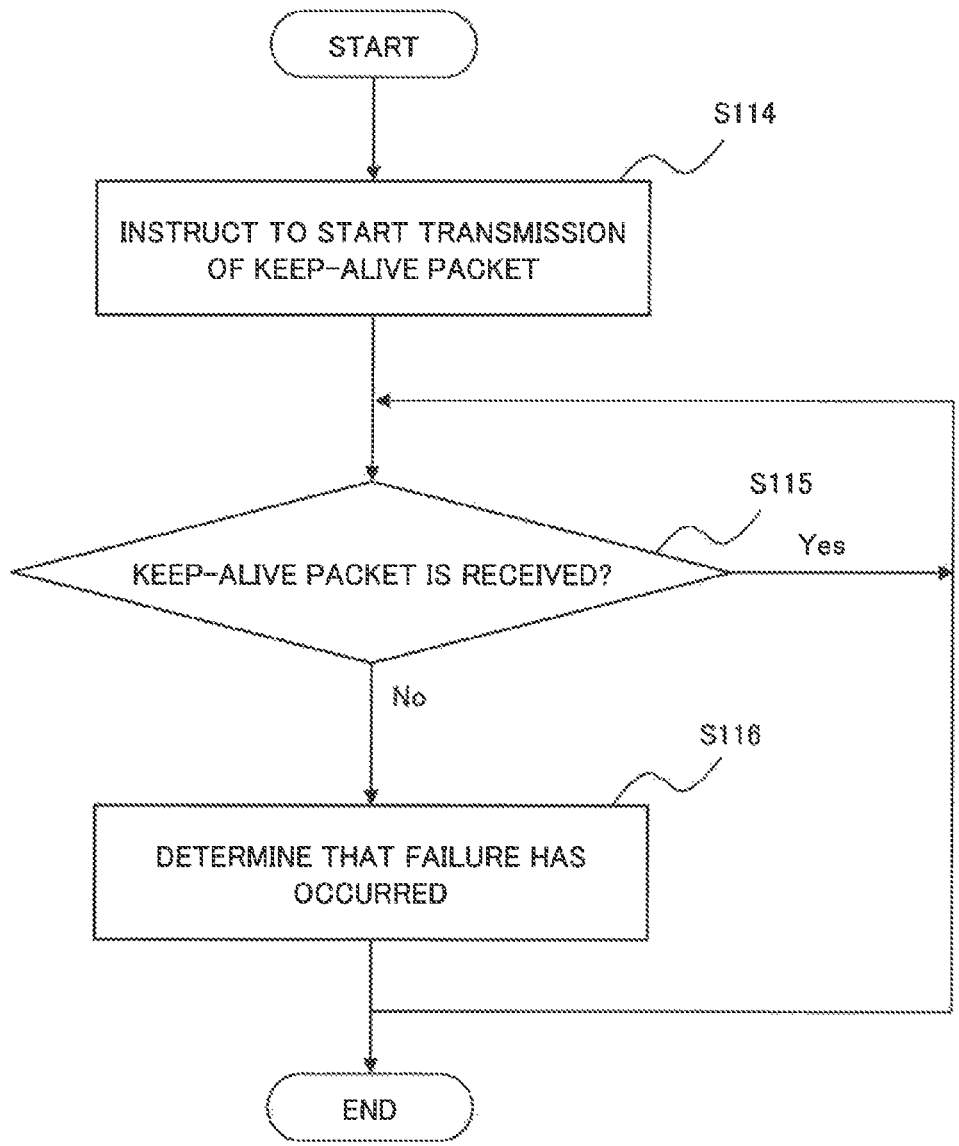
FIG. 8 is a flowchart illustrating another example of the WAN monitoring processing in the information processing system according to the second example embodiment of the present invention.

Next, the WAN monitoring processing in which the failure detection unit 321 in the management device 320 monitors the WAN 810-*i* will be described by using flowcharts in FIGS. 7 and 8. An example of the failure detection unit 321 monitoring the WAN 810-*i* by using either or both of operations illustrated in FIGS. 7 and 8 will be described here. The WAN monitoring processing exemplified in FIGS. 7 and 8 is started in response to the instruction by the communication-channel-configuration control unit 322 in Step S107.

First, the WAN monitoring processing illustrated in the flowchart in FIG. 7 will be described. In FIG. 7, first, the failure detection unit 321 in the management device 320 transmits a ping request packet to an IP address of the relay device 120 in the WAN 810-*i* (Step S110). Herewith, when receiving the ping request packet, the communication processing unit 123 in the relay device 120 transmits a ping response packet to the request source.

Next, the failure detection unit 321 determines whether or not the ping response packet is received within a predetermined time (Step S111).

When the ping response packet is received within the predetermined time, the failure detection unit 321 repeats the operation in Step S110. At that time, a pause time with a predetermined length may be provided before transmitting a next ping request packet.

On the other hand, when the ping response packet is not received within the predetermined time in Step S111, the failure detection unit 321 determines whether or not a reception failure has occurred a consecutive predetermined number of times (Step S112).

When the failure has not occurred the consecutive predetermined number of times, the failure detection unit 321 repeats the operation from Step S110. At that time, a pause time with a predetermined length may be provided before transmitting a next ping request packet.

On the other hand, when reception of the ping response packet has failed the consecutive predetermined number of times in Step S112, the failure detection unit 321 determines that a failure has occurred in the WAN 810-*i* and sends a notification to the communication-channel-configuration control unit 322 (Step S113).

The above concludes the description of the WAN monitoring processing using ping.

Next, the WAN monitoring processing by the flowchart in FIG. 8 will be described. In FIG. 8, first, the failure detection unit 321 in the management device 320 instructs the communication channel configuration unit 124 in the relay device 120 to start transmission of a keep-alive packet (Step S114). In accordance with the instruction, the communication channel configuration unit 124 transmits the keep-alive packet to the failure detection unit 321 at predetermined time intervals.

Next, the failure detection unit 321 in the management device 320 determines whether or not the keep-alive packet is received within a predetermined time (Step S115).

When the keep-alive packet is received within the predetermined time, the failure detection unit 321 repeats the operation in Step S115.

On the other hand, when the keep-alive packet is not received within the predetermined time in Step S115, the failure detection unit 321 determines that a failure has occurred in the WAN 810-*i* and sends a notification to the communication-channel-configuration control unit 322 (Step S116).

The above concludes the description of the WAN monitoring processing using a keep-alive packet.

(C) Alternative Communication Channel Configuration Processing

Figure 9:
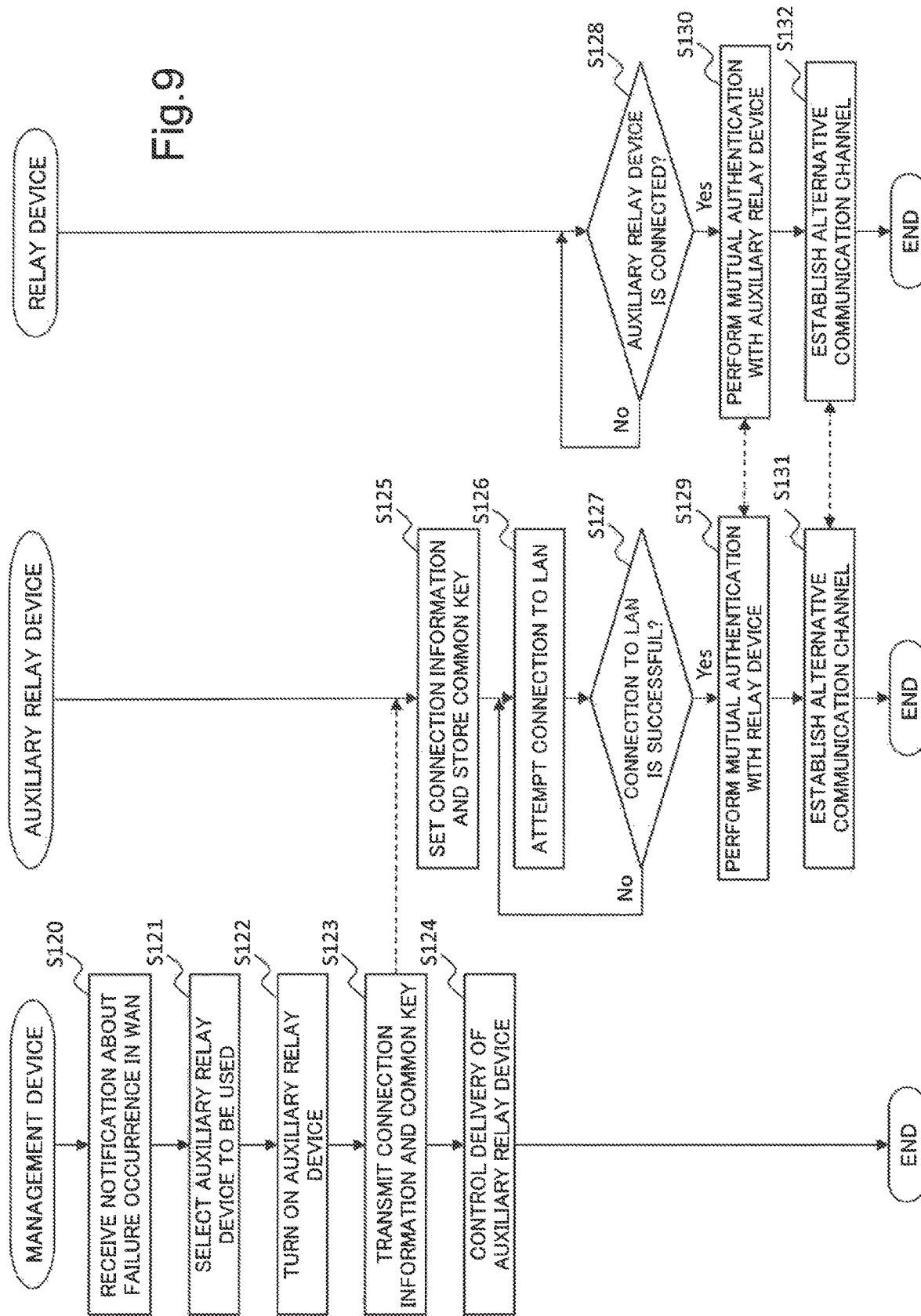
FIG. 9 is a flowchart illustrating alternative communication channel configuration processing in the information processing system according to the second example embodiment of the present invention.
Figure 10:
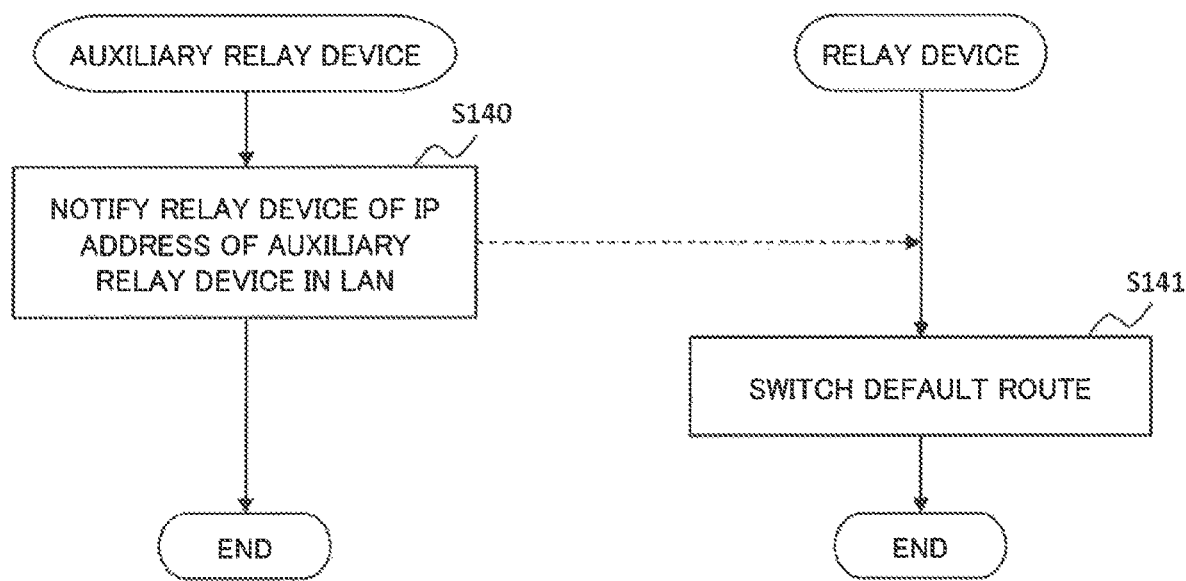
FIG. 10 is a flowchart illustrating details of processing of establishing an alternative communication channel by the information processing system according to the second example embodiment of the present invention.

Next an operation of the information processing system 2 configuring the alternative communication channel when a failure occurs in the WAN 810-*i* will be described by using flowcharts in FIGS. 9 and 10. In FIG. 9, the chart on the left illustrates an operation of the management device 320. Further, the chart at the center illustrates an operation of the auxiliary relay device 220. Further, the chart on the right illustrates an operation of the relay device 120.

In FIG. 9, first, the communication-channel-configuration control unit 322 in the management device 320 receives from the failure detection unit 321 information indicating that a failure is detected in the WAN 810-*i* (Step S120). A relay device 120 using the WAN 810-*i* in which the failure has occurred is hereinafter also simply described as a relay device 120 in the description of the alternative communication channel configuration processing.

Next, by using the auxiliary-relay-device selection unit 324, the communication-channel-configuration control unit 322 selects the auxiliary relay device 220 constituting the alternative communication channel for the WAN 810-*i* (Step S121). The auxiliary relay device 220 selected in this step is hereinafter also simply described as an auxiliary relay device 220 in the description of the alternative communication channel configuration processing.

Specifically, for example, the auxiliary-relay-device selection unit 324 may select the auxiliary relay device 220 satisfying any of the following conditions, or a combination of a part or the whole of the following conditions, based on a characteristic of the relay device 120, characteristics of the auxiliary relay devices 220, or a characteristic of the failure. Information indicating a characteristic of the relay device 120, characteristics of the auxiliary relay devices 220, or a characteristic of the failure required for determination of the conditions may be previously given. Alternatively, as another example, the information required for determination of the conditions may be dynamically acquired from an information-providing server providing information related to the WAN 810 and information related to a state of the WAN 810. In this case, for example, it is assumed that such the information-providing server is provided by a provider of each WAN 810 and is connectable through the Internet.

Condition 1: The auxiliary relay device 220 includes a fourth communication unit 222 connectable to the LAN 820 in the edge information system 10 using the WAN 810-*i* in which the failure is detected.

Condition 2: The auxiliary relay device 220 includes the third communication unit 221 capable of using the WAN 810 other than the WAN 810-*i* in which the failure is detected.

Condition 3: The auxiliary relay device 220 includes the third communication unit 221 capable of using the WAN 810 providing better communication quality in the edge information system 10 using the WAN 810-*i* in which the failure is detected.

Condition 4: The auxiliary relay device 220 includes the third communication unit 221 capable of using another WAN 810 determined to be more suitable, based on a position of which failure has occurred in the WAN 810-*i*, failure details, and the like. For example, when the WAN 810 is configured with a combination of one or more communication lines, another WAN 810 configured to include a communication line identical to a communication line at a spot where the failure has occurred in the WAN 810-*i* is not suitable for configuring the alternative communication channel. Further, another WAN 810 in which occurrence of a similar failure is predicted based on the failure details in the WAN 810-*i* is not suitable for configuring the alternative communication channel.

Next, the communication-channel-configuration control unit 322 instructs the auxiliary-relay-device control device 420 to turn on the auxiliary relay device 220. Then, the auxiliary-relay-device control device 420 turns on the auxiliary relay device 220 (Step S122).

Next, the communication-channel-configuration control unit 322 transmits the connection information to the LAN 820 and the common key that are stored in Step S104 to the auxiliary relay device 220 through the auxiliary-relay-device control device 420 (Step S123).

Next, the communication-channel-configuration control unit 322 controls the delivery control unit 323 in such a way as to deliver the auxiliary relay device 220 to a location of the relay device 120. Then, the delivery control unit 323 outputs delivery instruction information to the delivery company system 920 (Step S124).

Specifically, the delivery control unit 323 first selects the delivery company system 920 in an arrangements destination, and outputs to the selected delivery company system 920 delivery instruction information for delivering the applicable auxiliary relay device 220 from the auxiliary-relay-device keeping system 20 to the installation location of the relay device 120.

For example, the delivery control unit 323 may select the delivery company system 920 in an arrangements destination as follows. Specifically, the delivery control unit 323 selects the delivery company system 920 capable of delivering the auxiliary relay device 220 to the installation location of the relay device 120, based on an installation location of the auxiliary-relay-device keeping system 20, the installation location of the relay device 120, and delivery company information. When a plurality of applicable delivery company systems 920 exist, for example, the delivery control unit 323 selects the delivery company system 920 minimizing or maximizing a value of a certain indicator. For example, the delivery control unit 323 may use a delivery charge as an indicator and select the delivery company system 920 minimizing the delivery charge. Further, the delivery company system 920 may use a time required for delivery as an indicator and select the delivery company system 920 minimizing the time required for delivery.

Next, the auxiliary-communication-channel configuration unit 224 in the auxiliary relay device 220 performs setting processing by using the connection information transmitted from the management device 320 in Step S123 (Step S125).

Specifically, for example, the auxiliary-communication-channel configuration unit 224 sets to the fourth communication unit 222 an identifier of the LAN 820, authentication information required for connection to the LAN 820, and media information of the LAN 820, as information required for layer 2 (L2) link establishment with the LAN 820. Further, the auxiliary-communication-channel configuration unit 224 sets to the auxiliary communication processing unit 223 an IP address usable in the LAN 820, as information required for L3 communication with the LAN 820. Herewith, the auxiliary communication processing unit 223 uses the IP address as an IP address for the fourth communication unit 222 (that is, an IP address of the auxiliary relay device 220 in the LAN 820). Further, the auxiliary-communication-channel configuration unit 224 internally stores the common key by itself.

Next, the fourth communication unit 222 attempts connection (L2 link establishment) to the LAN 820 by using the connection information to the LAN 820 set in Step S125 (Step S126).

When connection to the LAN 820 is unsuccessful (No in Step S127), the fourth communication unit 222 repeats the operation from Step S126. At that time, a pause time with a predetermined length may be provided between the failure of connection to the LAN 820 and a next attempt.

On the other hand, when connection to the LAN 820 is successful (Yes in Step S127), the fourth communication unit 222 notifies the auxiliary-communication-channel configuration unit 224 of the successful connection.

Further, when the auxiliary relay device 220 is connected to the LAN 820 (Yes in Step S128), the second communication unit 122 in the relay device 120 notifies the communication channel configuration unit 124 that the auxiliary relay device 220 is connected.

Next, based on the notifications, the communication channel configuration unit 124 and the auxiliary-communication-channel configuration unit 224 perform mutual authentication (Steps S129 and S130). For example, the communication channel configuration unit 124 and the auxiliary-communication-channel configuration unit 224 may authenticate one another by a challenge-response system, by using the common key stored in Steps S106 and S125, respectively. When the authentication is unsuccessful, the information processing system 2 may end the processing.

When the authentication is successful, the communication channel configuration unit 124 and the auxiliary-communication-channel configuration unit 224 establish the alternative communication channel to a communication channel including the WAN 810-*i* connecting the relay device 120 and the server 91 (Steps S131 and S132). The alternative communication channel is a communication channel passing through the WAN 810-*j* used by the auxiliary relay device 220. Details of the steps will be described later. By the establishment of the alternative communication channel, the relay device 120 is able to communicate with the server 91 through the WAN 810-*j* used by the auxiliary relay device 220 in place of the WAN 810-*i* in which the failure has occurred.

Details of the processing of establishing the alternative communication channel in Steps S131 and S132 will be described by using a flowchart in FIG. 10. In FIG. 10, the chart on the left illustrates an operation of the auxiliary relay device 220. Further, the chart on the right illustrates an operation of the relay device 120.

First, the auxiliary-communication-channel configuration unit 224 in the auxiliary relay device 220 notifies an IP address of the auxiliary relay device 220 in the LAN 820 to the communication channel configuration unit 124 in the relay device 120 (Step S140). The IP address of the auxiliary relay device 220 in the LAN 820 is the address set in Step S125.

Next, the communication channel configuration unit 124 in the relay device 120 switches a next hop of a default route used in communication with the server 91 by the communication processing unit 123 to the IP address of the auxiliary relay device 220 in the LAN 820 notified in Step S140 (Step S141). Additionally, a case of the communication processing unit 123 being configured to perform NAT processing and NAPT processing will be described. In this case, the communication channel configuration unit 124 switches an IP address on the Internet side used for address translation by the communication processing unit 123 from the IP address of the relay device 120 in the WAN 810-$i$ to the IP address in the LAN 820.

The above concludes the description of the alternative communication channel configuration processing in the information processing system 2.

Next, effects of the second example embodiment of the present invention will be described.

The information processing system according to the second example embodiment of the present invention is able to further improve availability in a widely distributed information processing system, without providing an individual relay device with an auxiliary communication line that provides redundancy for a communication line between the relay device and a server.

The reason will be described. According to the present example embodiment, an auxiliary-relay-device keeping system includes one or more auxiliary relay devices each providing an edge information system with the alternative communication channel including an auxiliary WAN communication line (third communication line). Further, a management device previously stores information related to mutual communication and authentication between a relay device in an edge information system and the auxiliary relay device. Further, the management device monitors a state of a WAN communication line (first communication line) normally used by the edge information system, and when detecting a failure, provides the alternative communication channel by using the auxiliary relay device. At that time, the management device selects the auxiliary relay device constituting the alternative communication channel, based on a characteristic of the relay device, characteristics of the auxiliary relay devices, or a characteristic of the failure. Further, the management device selects a delivery company system, based on installation locations of the edge information system and the relay device, an installation location of the auxiliary-relay-device keeping system, delivery company information, or the like, and outputs delivery instruction information. Herewith, the auxiliary relay device is delivered to the location of the edge information system by the selected delivery company system. Then, when the auxiliary relay device is delivered to the edge information system, the relay device and the auxiliary relay device automatically establish the alternative communication channel including a WAN communication line (third communication line) used by the auxiliary relay device. Then, the relay device is able to transmit and receive data transmitted and received to and from a device by the second communication unit to and from a server by using the alternative communication channel.

Thus, the present example embodiment is able to improve availability of an information processing system, without providing an individual relay device with an auxiliary WAN communication line for redundancy. Consequently, the present example embodiment is able to reduce an initial introduction cost and an operational cost of the information processing system. Further, even when a failure occurs on a first communication line connecting a relay device to a server, the present example embodiment is able to restore relay processing by using an automatically established alternative communication channel, without involving an engineer or an operator with knowledge about communication and an information processing system. Consequently, the present example embodiment is able to reduce an operational cost and also shorten a time from the occurrence of the failure to restoration.

The information processing system according to the present example embodiment may be composed of subsystems owned, operated, or used by a plurality of operators. For example, a provider owning a server and an edge information system (information system operator) may be different from a provider owning a management device and an auxiliary-relay-device keeping system (auxiliary line provider). For example, the auxiliary line provider may be a provider providing an auxiliary-line-providing service of providing an information system provider with an auxiliary line. In this case, the auxiliary line provider receives a usage fee from the information system provider in exchange for providing the service. The auxiliary line provider may provide the auxiliary-line-providing service for a plurality of different information system provider by using the management device and the auxiliary-relay-device keeping system.

Further, while an example of delivering an auxiliary relay device with the power turned on has been described in the present example embodiment, the present invention is not limited to the example. As another example, for example, an auxiliary relay device may be turned off during delivery and may be turned on after being delivered to an installation location of a relay device. In that case, after Step S123 is completed, a communication-channel-configuration control unit instructs an auxiliary-relay-device control device to turn off the auxiliary relay device, and the auxiliary-relay-device control device turns off the auxiliary relay device. Further, in Step S124, the communication-channel-configuration control unit notifies a delivery control unit to mention a message being "turn the power on upon delivery completion" on a delivery slip delivered along with the auxiliary relay device. Then, the delivery control unit may output to a selected delivery company system delivery instruction information instructing output of a delivery slip including such a message. In this case, the auxiliary relay device is expected to be turned on by a deliverer or a consignee, in accordance with the message printed on the delivery slip upon delivery completion. Then, the auxiliary relay device with the power turned on may start the operation from Step S126.

Further, while an example of a management device including the failure detection unit has been described in the present example embodiment, the present invention is not limited to the example. As another example, a server may include the failure detection unit.

Further, while an example of one second communication line has been described in the present example embodiment, the present invention is not limited to the example. As another example, for example, the relay device 120 may include a plurality of the second communication units 122 and be connected to a plurality of the second communication lines. For example, the units may use different communication methods. Further, for example, one of the second communication lines may be dedicated to communication with the auxiliary relay device 220.

Further, while an example of the second communication unit being included in the relay device 120 has been described in the present example embodiment, the present invention is not limited to the example. As another example, the second communication unit may be implemented as another device independent from the relay device 120 (for example, a wireless LAN access point). In that case, functions of the communication channel configuration unit 124 and the communication processing unit 123 may be implemented as the relay device 120 and the independent device in a distributed manner.

Third Example Embodiment

Next, a third example embodiment of the present invention will be described in detail with reference to drawings.

An example of a delivery control unit using a delivery company system in order to control delivery of an auxiliary relay device has been described in the second example embodiment of the present invention. An example of a delivery control unit using a moving device moving autonomously or semi-autonomously, in order to control delivery of an auxiliary relay device, will be described in the present example embodiment. In each drawing referred to in the description of the present example embodiment, a configuration similar to and a step operating similar to those according to the second example embodiment of the present invention are respectively given reference signs similar to those in the second example embodiment, and detailed description in the present example embodiment is omitted.

Figure 11:
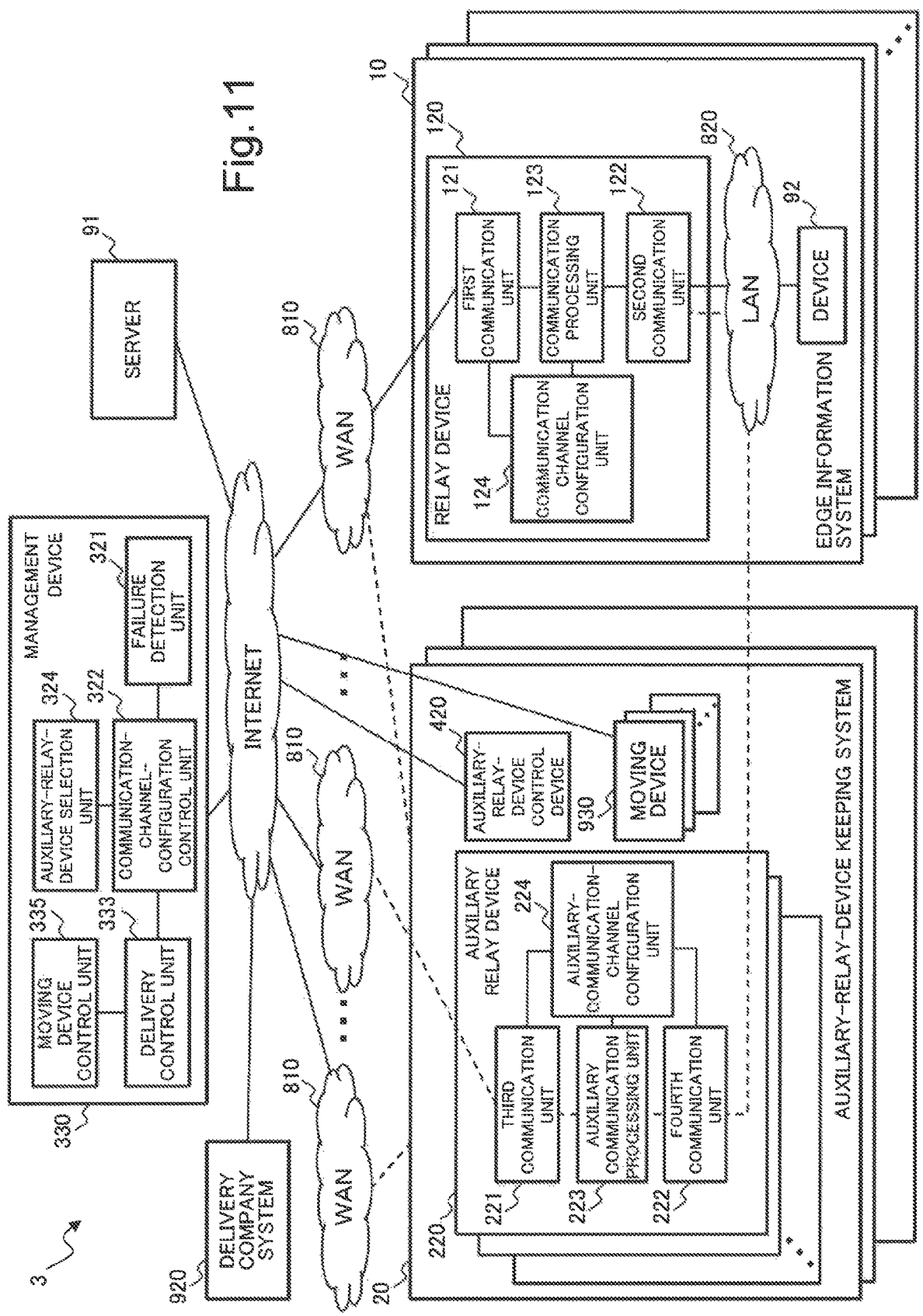
FIG. 11 is a block diagram illustrating a configuration of an information processing system according to a third example embodiment of the present invention.

First, a configuration of an information processing system 3 according to the third example embodiment of the present invention will be described by using FIG. 11. In FIG. 11, the information processing system 3 differs from the information processing system 2 according to the second example embodiment of the present invention in including a management device 330 in place of the management device 320 and further including a moving device 930. The moving device 930 is included in the auxiliary-relay-device keeping system 20. Further, the management device 330 differs from the management device 320 according to the second example embodiment of the present invention in including a delivery control unit 333 in place of the delivery control unit 323. Additionally, the management device 330 differs in including a moving device control unit 335. The moving device control unit 335 constitutes an example embodiment of part of the delivery control unit according to the present invention.

While FIG. 11 illustrates three moving devices 930 in one auxiliary-relay-device keeping system 20, a number of moving devices 930 included in one auxiliary-relay-device keeping system 20 is not limited.

The moving device 930 is a device moving autonomously or semi-autonomously, in accordance with control by the management device 330. For example, the moving device 930 may be an unmanned aerial vehicle (UAV or called a drone]) or a self-driving vehicle. For example, the moving device 930 includes driving devices such as a motor, an engine, a rotor, a propeller, and a wheel, and moves by using the devices.

Figure 12:
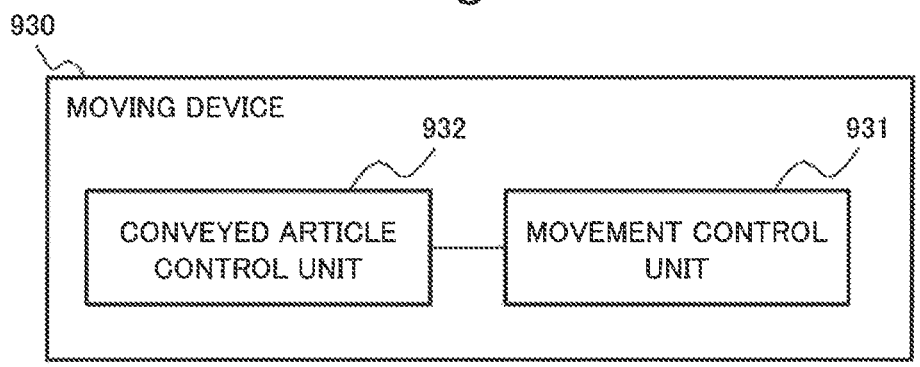
FIG. 12 is a block diagram illustrating a configuration of a moving device according to the third example embodiment of the present invention.

Next, FIG. 12 illustrates a detailed configuration of the moving device 930. In FIG. 12, the moving device 930 includes a movement control unit 931 and a conveyed article control unit 932.

Figure 13:
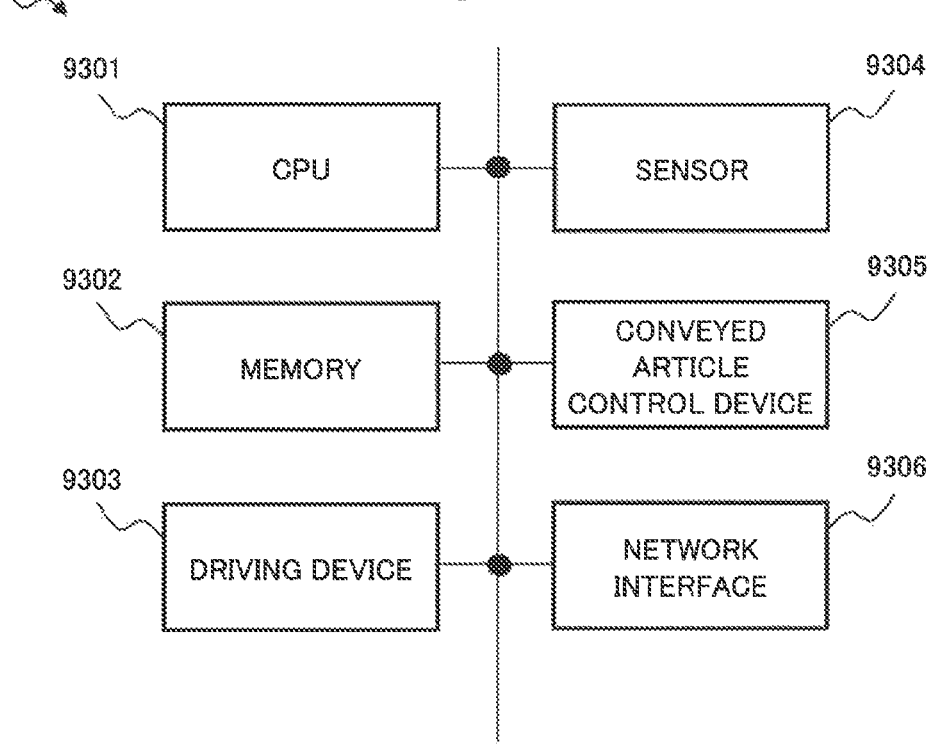
FIG. 13 is a diagram illustrating a hardware configuration example of the moving device according to the third example embodiment of the present invention.

FIG. 13 illustrates a hardware configuration example of the moving device 930. In FIG. 13, the moving device 930 includes a CPU 9301, a memory 9302, a driving device 9303, a sensor 9304, a conveyed article control device 9305, and a network interface 9306. The CPU 9301 reads and executes a computer program stored in the memory 9302. For example, the driving device 9303 may be composed of a motor, an engine, a rotor, a propeller, a wheel, and the like but is not limited to the above. The driving device 9303 may be composed of a plurality of driving devices. Further, the sensor 9304 may be composed of a camera, a radar, a global positioning system (GPS) reception device, a gyro-sensor, an acceleration sensor, an altimeter, or a speedometer but is not limited to the above. The sensor 9304 may be composed of a plurality of sensors. The conveyed article control device 9305 is a device fixing a conveyed article to the moving device 930. The network interface 9306 is an interface connected to a network. In this case, the movement control unit 931 is configured with the driving device 9303, the sensor 9304, the network interface 9306, and the CPU 9301 reading and executing a computer program stored in the memory 9302. Further, the conveyed article control unit 932 is configured with the conveyed article control device 9305, the network interface 9306, and the CPU 9301 reading and executing a computer program stored in the memory 9302.

The movement control unit 931 moves the moving device 930 by controlling the driving device 9303, based on information from various types of sensors 9304. For example, the movement control unit 931 may control the driving device 9303 in such a way as to determine, based on externally input information related to a destination, a moving route to the destination by itself and move the moving device 930 following the route. Alternatively, the movement control unit 931 may move the moving device 930 by controlling the driving device 9303, based on control information input from an external device (for example, the management device 330) through the network interface 9306. In that case, the movement control unit 931 may transmit sensor information acquired from various types of sensors 9304 to the external device and receive control details related to the driving device 9303 from the external device.

The conveyed article control unit 932 fixes the auxiliary relay device 220 being a conveyed article to the moving device 930 by using the conveyed article control device 9305. Further, the conveyed article control unit 932 carries in and carries out a conveyed article by using the conveyed article control device 9305. Further, the conveyed article control unit 932 may have a function of giving a physical action including power supply, power on, power off, and reset on the auxiliary relay device 220.

Next, details of the functional blocks, which are different from those in the management device 320, in the configuration of the management device 330 according to the second example embodiment of the present invention will be described.

When delivering the auxiliary relay device 220 from the auxiliary-relay-device keeping system 20 to the edge information system 10, the delivery control unit 333 uses either one of the delivery company system 920 and the moving devices 930. A configuration of the delivery control unit 333 in a case of using the delivery company system 920 is similar to that of the delivery control unit 323 according to the second example embodiment of the present invention. When using the moving device 930, the delivery control unit 333 controls delivery of the auxiliary relay device 220 by using the moving device control unit 335 to be described later.

Further, the delivery control unit 333 stores moving device information for each moving device 930. For example, the moving device information may include the following information in part or in whole. For example, the delivery control unit 333 may acquire and store previously input information as the moving device information. Alternatively, the delivery control unit 333 may acquire and store information transmitted from the moving device 930 as the moving device information.

An identifier of the moving device 930
Information for connecting to the moving device 930 (such as a communication address)
A type of the moving device 930
A movable range, a moving speed, and a time required for moving the moving device 930
A charge for moving the moving device 930

The moving device control unit 335 transmits to the moving device 930 instruction information instructing the moving device 930 indicated by the delivery instruction information from the delivery control unit 333 to be moved to a destination indicated by the delivery instruction information. When the moving device 930 is movable by autonomous control, the moving device control unit 335 may include information related to the destination indicated by the delivery instruction information into the instruction information and output the instruction information. Further, when the moving device 930 is not movable by autonomous control, the moving device control unit 335 determines control contents of the driving device 9303 in the moving device 930, based on sensor information or the like acquired from the movement control unit 931 in the moving device 930. Then, the moving device control unit 335 may include the determined control contents into the instruction information and transmit the instruction information to the movement control unit 931. Herewith, the moving device 930 moves to the location indicated by the instruction information.

An operation of the information processing system 3 configured as described above will be described in detail with reference to drawings. The (A) initial registration processing and the (B) WAN monitoring processing in the information processing system 3 are similar to the operations according to the second example embodiment of the present invention, and therefore description in the present example embodiment is omitted. (C) alternative communication channel configuration processing will be described here.

(C) Alternative Communication Channel Configuration Processing

Processing of the information processing system 3 configuring the alternative communication channel provided for the edge information system 10 is almost similar to the alternative communication channel configuration processing according to the second example embodiment of the present invention described by using FIG. 9. However, details of processing of controlling delivery of the auxiliary relay device 220 in Step S124 differ.

In Step S124, the communication-channel-configuration control unit 322 controls the delivery control unit 333 in such a way as to deliver the auxiliary relay device 220 to a location of the edge information system 10. Then, the delivery control unit 333 selects a technique for delivering the auxiliary relay device 220 to the location of the edge information system 10 from the delivery company systems 920 and the moving devices 930.

For example, the delivery control unit 333 may select one of one or more delivery company systems 920 and one or more moving devices 930 as follows. Specifically, the delivery control unit 333 refers to an installation location of the auxiliary-relay-device keeping system 20, an installation location of the relay device 120, delivery company information, and moving device information. Then, based on the aforementioned information, the delivery control unit 333 selects the delivery company system 920 or the moving device 930 capable of delivering the auxiliary relay device 220 to the installation location of the relay device 120. At this time, when a plurality of applicable delivery company systems 920 or moving devices 930 exist, for example, the delivery control unit 333 may select a delivery company system 920 or a moving device 930 minimizing or maximizing a value of a certain indicator. For example, the delivery control unit 333 may use a delivery charge as an indicator and select a delivery company system 920 or a moving device 930 minimizing the delivery charge. Alternatively, the delivery control unit 333 may use a time required for delivery as an indicator and select a delivery company system 920 or a moving device 930 minimizing the time required for delivery.

Figure 14:
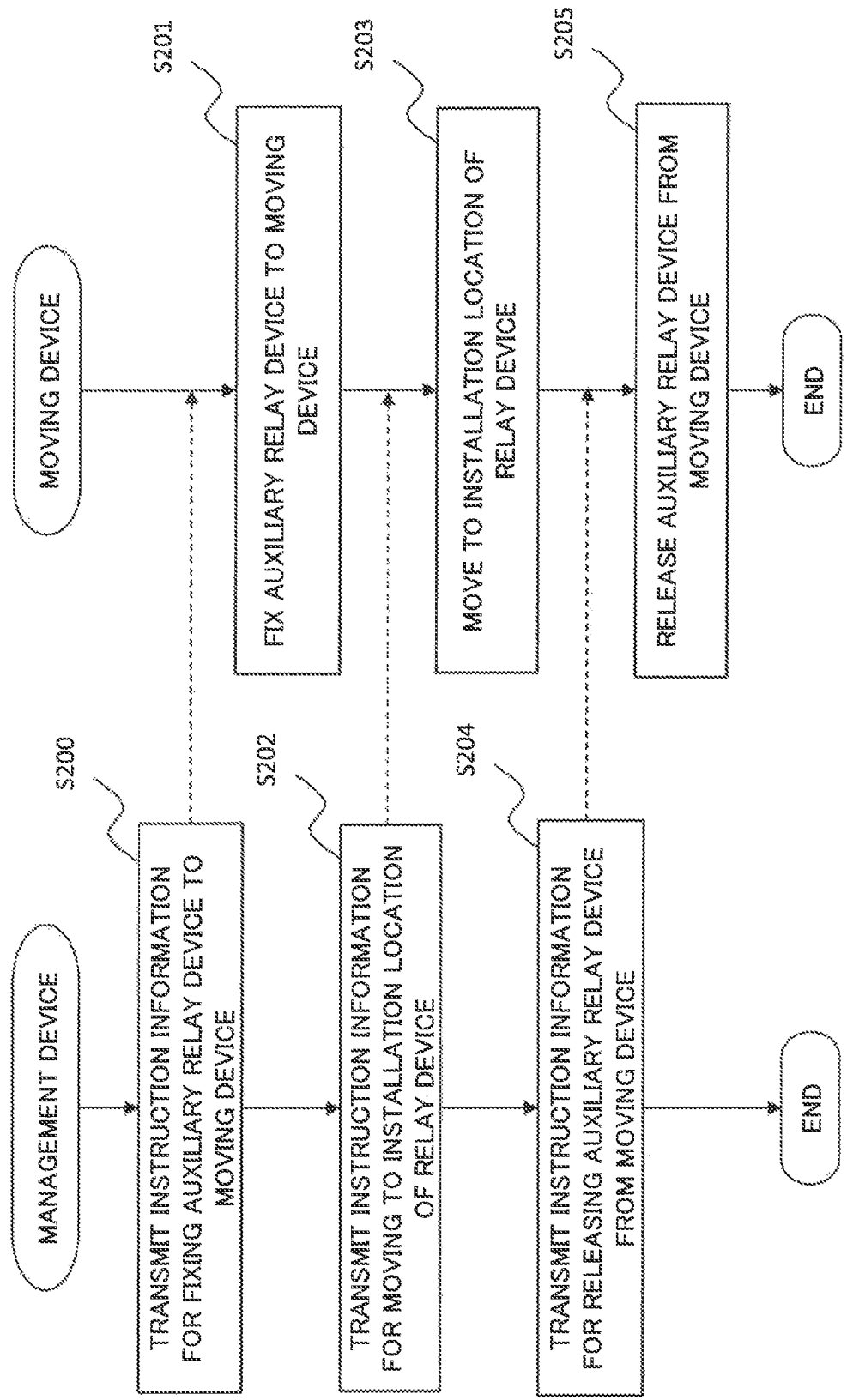
FIG. 14 is a flowchart illustrating an operation of controlling delivery of an auxiliary relay device by using the moving device by the information processing system according to the third example embodiment of the present invention.

Then, when the moving device 930 is selected by the delivery control unit 333, the information processing system 3 executes an operation illustrated in FIG. 14. In FIG. 14, the chart on the left illustrates an operation of the management device 330. Further, the chart on the right illustrates an operation of the moving device 930.

In FIG. 14, the moving device control unit 335 in the management device 330 transmits to the moving device 930 instruction information instructing to fix the auxiliary relay device 220 to the moving device 930 (Step S200).

Next, when receiving the instruction information, the conveyed article control unit 932 in the moving device 930 fixes the auxiliary relay device 220 to the moving device 930 (Step S201).

Next, the moving device control unit 335 in the management device 330 transmits to the moving device 930 instruction information instructing to move to the installation location of the relay device 120 (Step S202).

Next, when receiving the instruction information, the movement control unit 931 in the moving device 930 moves itself to the installation location of the relay device 120 (Step S203).

Next, the moving device control unit 335 in the management device 330 transmits to the moving device 930 instruction information instructing to release the auxiliary relay device 220 from the moving device 930 (Step S204).

Next, when receiving the instruction information, the conveyed article control unit 932 in the moving device 930 releases the auxiliary relay device 220 from the moving device 930 (Step S205).

The above concludes the description of the processing of configuring the alternative communication channel by the information processing system 3.

Next, effects of the third example embodiment of the present invention will be described.

The information processing system 3 according to the third example embodiment of the present invention is able to more reliably provide effects similar to those according to the second example embodiment of the present invention.

The reason will be described. According to the present example embodiment, a delivery control unit in a management device controls delivery of an auxiliary relay device required to move to a location of a relay device for establishing the alternative communication channel, by using not only a delivery company system but also a moving device movable autonomously or semi-autonomously. Herewith, the present example embodiment is able to more reliably establish the alternative communication channel.

Fourth Example Embodiment

Next, a fourth example embodiment of the present invention will be described in detail with reference to drawings. An example of the relay device being connected to the server by using the alternative communication channel passing through the auxiliary relay device has been described in the second example embodiment of the present invention. An example of configuring the alternative communication channel in such a way that an auxiliary relay device operates in place of a relay device will be described in the present example embodiment. In each drawing referred to in the description of the present example embodiment, a configuration similar to and a step operating similarly to those according to the second example embodiment of the present invention are respectively given reference signs identical to those in the second example embodiment, and detailed description in the present example embodiment is omitted.

Figure 15:
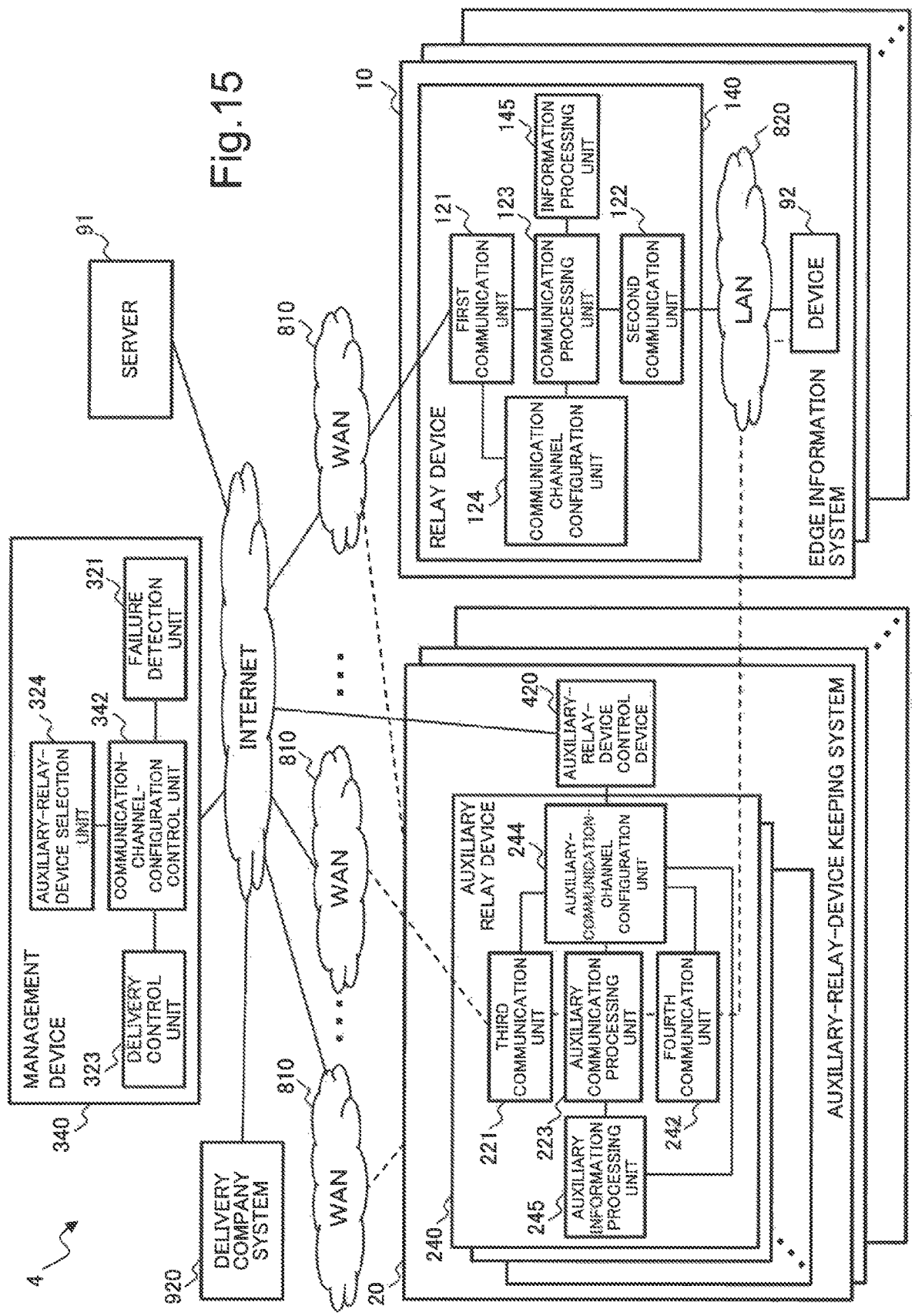
FIG. 15 is a block diagram illustrating a configuration of an information processing system according to a fourth example embodiment of the present invention.

First, a configuration of an information processing system 4 according to the fourth example embodiment of the present invention will be described by using FIG. 15. In FIG. 15, the information processing system 4 differs from the information processing system 2 according to the second example embodiment of the present invention in including a relay device 140 in place of the relay device 120, an auxiliary relay device 240 in place of the auxiliary relay device 220, and a management device 340 in place of the management device 320. Further, the relay device 140 includes an information processing unit 145 in addition to a configuration similar to that of the relay device 120 according to the second example embodiment of the present invention. Further, the auxiliary relay device 240 differs from the auxiliary relay device 220 according to the second example embodiment of the present invention in including a fourth communication unit 242 in place of the fourth communication unit 222 and an auxiliary-communication-channel configuration unit 244 in place of the auxiliary-communication-channel configuration unit 224. Additionally, the auxiliary relay device 240 also differs in including an auxiliary information processing unit 245. Further, the management device 340 differs from the management device 320 according to the second example embodiment of the present invention in including a communication-channel-configuration control unit 342 in place of the communication-channel-configuration control unit 322.

First, out of the functional blocks in the relay device 140, a configuration different from that according to the second example embodiment of the present invention will be described.

For example, the information processing unit 145 may be configured with a CPU 1001 and a memory 1002. The information processing unit 145 performs primary processing on data transmitted from the device 92. In the device 92, a communication address of the relay device 140 in a LAN 820 may be set as a transmission destination of data to undergo primary processing by the information processing unit 145. Further, the information processing unit 145 may receive through the communication processing unit 123 data transmitted to the server 91 from the device 92 and perform primary processing on the data. Further, the information processing unit 145 may transmit a response to the device 92 in place of the server 91.

Next, out of the functional blocks in the auxiliary relay device 240, a configuration different from that according to the second example embodiment of the present invention will be described.

In addition to being configured similarly to the auxiliary-communication-channel configuration unit 224 according to the second example embodiment of the present invention, the auxiliary-communication-channel configuration unit 244 is configured to perform processing for the auxiliary relay device 240 to operate as a replacement of the relay device 140 in the edge information system 10. Such processing is performed in cooperation with the management device 340.

Specifically, the auxiliary-communication-channel configuration unit 244 sets to the fourth communication unit 242 information for serving as a master unit in the LAN 820 in addition to information for connecting to the LAN 820. Further, the auxiliary-communication-channel configuration unit 244 sets to the auxiliary communication processing unit 223 information for determining processing contents in such a way as to perform communication processing similarly to the communication processing unit 123 in the relay device 140. Further, the auxiliary-communication-channel configuration unit 244 sets to the auxiliary information processing unit 245 information for determining processing contents in such a way as to perform information processing similarly to the information processing unit 145 in the relay device 140.

The fourth communication unit 242 has a function of being capable of operating as a master unit when connected to the LAN 820 being a second communication line. For example, the fourth communication unit 242 has a function as a master unit (access point) in a wireless LAN, Bluetooth, or Zigbee, and reports an identifier of the LAN 820. Further, the fourth communication unit 242 performs authentication and authorization of a slave unit requesting connection to the LAN 820.

For example, the auxiliary information processing unit 245 may be configured with a CPU 2001 and a memory 2002. The auxiliary information processing unit 245 performs primary processing similar to that in the information processing unit 145 in the relay device 140 on data transmitted from the device 92, in accordance with information set by the auxiliary-communication-channel configuration unit 244.

Next, out of the functional blocks in the management device 340, a configuration different from that according to the second example embodiment of the present invention will be described.

The communication-channel-configuration control unit 342 is configured similarly to the communication-channel-configuration control unit 322 according to the second example embodiment but differs in the following point. In the second example embodiment of the present invention, the communication-channel-configuration control unit 322 performs control in such a way as to configure the alternative communication channel connecting the relay device 120 to the server 91 through the auxiliary relay device 220. In the present example embodiment, the communication-channel-configuration control unit 342 performs control in such a way that the auxiliary relay device 240 operates as a replacement of the relay device 140 in the edge information system 10. The control is performed in cooperation with the relay device 140 and the auxiliary relay device 240.

Specifically, the communication-channel-configuration control unit 342 acquires from the relay device 140 configuration information for operating in place of the relay device 140 in the LAN 820 in addition to connection information for connecting to the LAN 820. Examples of information included in the connection information are as described in the second example embodiment of the present invention. The configuration information may include communication processing contents of the relay device 140, information processing contents, information for operating as a master unit in the LAN 820, and the like. Then, the communication-channel-configuration control unit 342 stores the acquired connection information and configuration information, which are associated with information indicating the relay device 140. Then, the communication-channel-configuration control unit 342 transmits the stored connection information and the stored configuration information, which are associated with the information indicating a relay device 140 in which a failure is detected in the WAN 810-$i$, to the auxiliary-communication-channel configuration unit 244 in the auxiliary relay device 240 selected for configuring the alternative communication channel.

The following information is cited as specific examples of the aforementioned configuration information. For example, the communication-channel-configuration control unit 342 may acquire the following information in part or in whole from the relay device 140 and store the acquired information being associated with information indicating the relay device 140.

Contents of information processing executed in the information processing unit 145, a program, and a virtual machine (VM) image Contents of communication processing executed in the communication processing unit 123

Information for operating as a master unit in the LAN 820 used by the second communication unit 122

An operation of the information processing system 4 configured as described above will be described in detail with reference to drawings. (B) WAN monitoring processing in the information processing system 4 is similar to the operation according to the second example embodiment of the present invention, and therefore description in the present example embodiment is omitted. (A) initial registration processing and (C) alternative communication channel configuration processing will be described here.

(A) Initial Registration Processing

First, the initial registration processing of registering information of the edge information system 10 in the management device 340 will be described. While the information processing system 4 operates almost similarly to the initial registration processing according to the second example embodiment of the present invention described by using FIG. 6, details of operations in Steps S101, S102, and S104 differ.

In Step S101, the communication-channel-configuration control unit 342 in the management device 340 requests to the relay device 140 the connection information to the LAN 820 and the configuration information related to the relay device 140.

Further, in Step S102, the communication channel configuration unit 124 in the relay device 140 transmits to the communication-channel-configuration control unit 342 in the management device 340 the connection information to the LAN 820 to which the own device is connected and the configuration information related to the own device.

Further, in Step S104, the communication-channel-configuration control unit 342 in the management device 340 stores the information acquired in Steps S100 and S102, and the common key generated in Step S103, which are associated with information indicating the relay device 140.

The above concludes the description of the initial registration processing in the information processing system 4.

(C) Alternative Communication Channel Configuration Processing

Figure 16:
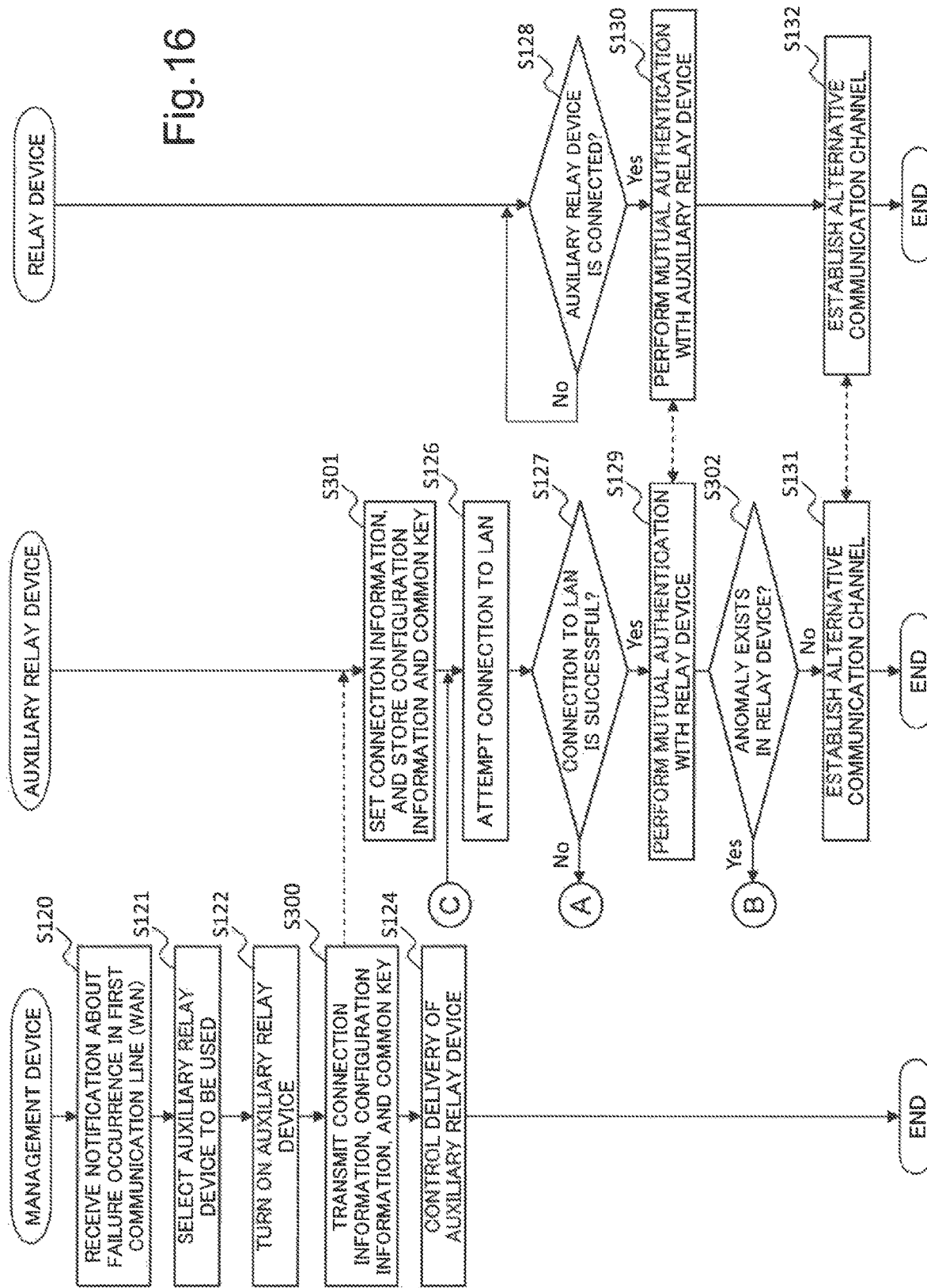
FIG. 16 is a flowchart illustrating alternative communication channel configuration processing in the information processing system according to the fourth example embodiment of the present invention.

Next, the alternative communication channel configuration processing of configuring the alternative communication channel provided for the edge information system 10 will be described by using a flowchart in FIG. 16. The alternative communication channel configuration processing exemplified in FIG. 16 is started when a failure is detected in the WAN 810-*i* by the failure detection unit 321. In the flowchart in FIG. 16, Steps S120 to S122 are operations similar to those according to the second example embodiment of the present invention.

Next, the communication-channel-configuration control unit 342 transmits the connection information to the LAN 820, the configuration information related to the relay device 140, and the common key that are stored in Step S104 to the auxiliary relay device 240 through the auxiliary-relay-device control device 420 (Step S300).

Next, the communication-channel-configuration control unit 342 executes Step S124 similarly to the second example embodiment of the present invention. Herewith, delivery of the applicable auxiliary relay device 240 is controlled.

Next, the auxiliary-communication-channel configuration unit 244 in the auxiliary relay device 240 performs setting processing by using the connection information to the LAN 820 within the information transmitted from the management device 340 in Step S300 (Step S301).

Specifically, for example, the auxiliary-communication-channel configuration unit 244 sets to the fourth communication unit 242 an identifier of the LAN 820, authentication information required for connection to the LAN 820, and media information of the LAN 820, as information required for L2 link establishment with the LAN 820. Further, the auxiliary-communication-channel configuration unit 244 sets to the auxiliary communication processing unit 223 an IP address usable in the LAN 820, as information required for L3 communication with the LAN 820. Then, the auxiliary communication processing unit 223 uses the relevant IP address as an IP address when communicating by using the fourth communication unit 242 (that is, an IP address of the auxiliary relay device 240 in the LAN 820). Further, the auxiliary-communication-channel configuration unit 244 stores the configuration information of the relay device 140 and the common key.

Thereafter, the information processing system 4 operates similarly to the second example embodiment of the present invention in Steps S126 to S130. That is, when the fourth communication unit 242 is successfully connected to the LAN 820 (establishes an L2 link), the communication channel configuration unit 124 and the auxiliary-communication-channel configuration unit 244 perform mutual authentication. However, an operation in a case of connection to the LAN 820 by the fourth communication unit 242 being unsuccessful in Step S127 differs from that according to the second example embodiment of the present invention. The operation in this case will be described later.

Next, the auxiliary-communication-channel configuration unit 244 acquires from the communication channel configuration unit 124 in the relay device 140 information indicating existence or nonexistence of an anomaly related to an operation of each unit in the relay device 140, including the information processing unit 145 (Step S302). When mutual authentication is unsuccessful in Steps S129 and S130, the auxiliary-communication-channel configuration unit 244 may determine in this step that an anomaly exists in the relay device 140.

When acquiring information indicating that an anomaly does not exist in Step S302, the communication channel configuration unit 124 and the auxiliary-communication-channel configuration unit 244 execute Steps S131 and S132, similarly to the second example embodiment in the present invention. Herewith, an alternative communication route passing through the WAN 810-*j* in the auxiliary relay device 240 is established between the relay device 140 and the server 91.

On the other hand, a case of connection to the LAN 820 by the auxiliary relay device 240 being unsuccessful in Step S127 will be described. An operation in this case is illustrated in FIG. 17.

Figure 17:
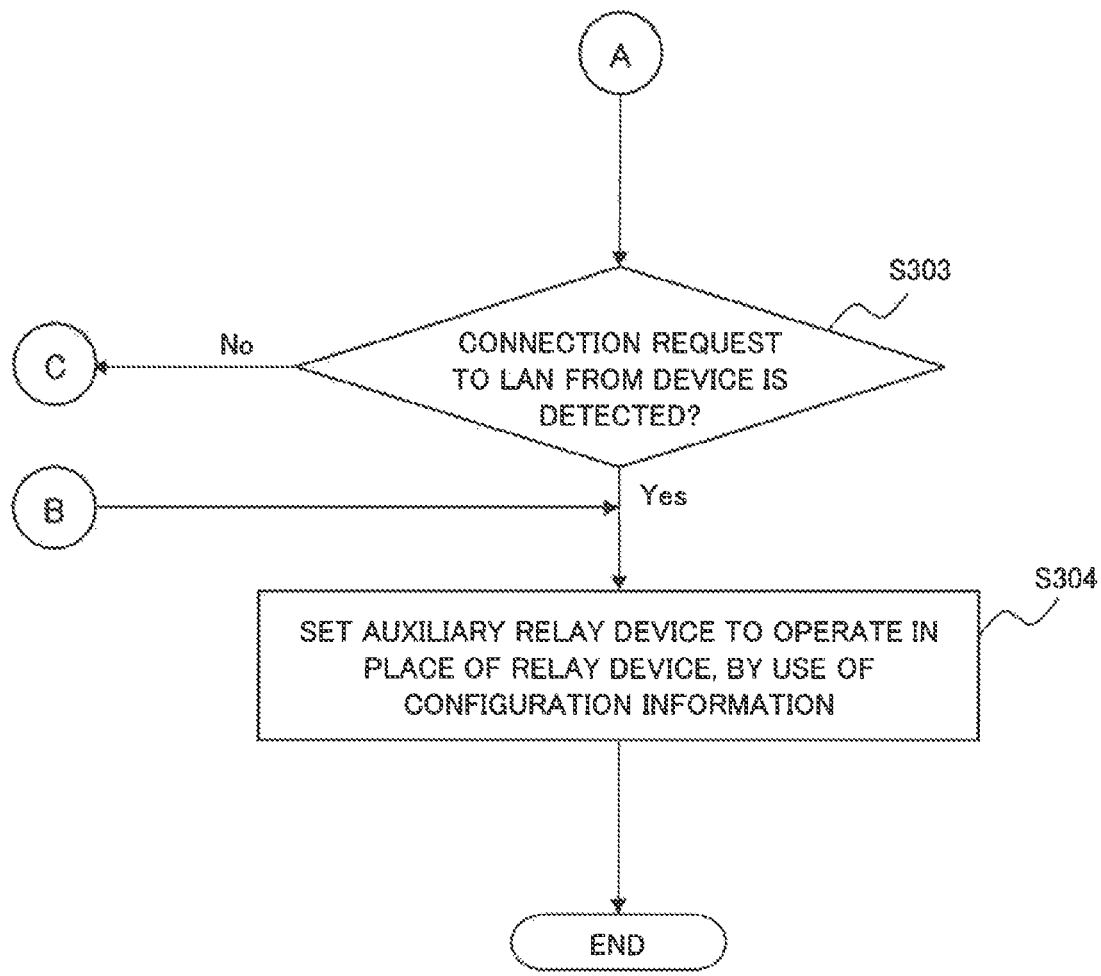
FIG. 17 is a flowchart following FIG. 16.

In FIG. 17, the auxiliary-communication-channel configuration unit 244 sets the fourth communication unit 242 to a master unit mode, and determines whether or not a connection request to the LAN 820 from the device 92 exists (Step S303).

When the connection request to the LAN 820 from the device 92 is not detected, the auxiliary-communication-channel configuration unit 244 sets the fourth communication unit 242 to a slave unit mode, and repeats the operation from Step S126. At that time, a predetermined pause time may be provided before an attempt in next Step S126.

On the other hand, a case of a connection request to the LAN 820 from the device 92 being detected in Step S303 or an anomaly of the relay device 140 being confirmed in Step S302 will be described. In this case, the auxiliary-communication-channel configuration unit 244 configures the auxiliary relay device 240 as an alternative to the relay device 140 (Step S304).

Specifically, the auxiliary-communication-channel configuration unit 244 performs setting to the auxiliary communication processing unit 223, the fourth communication unit 242, and the auxiliary information processing unit 245, by using the configuration information of the relay device 140, the information being stored in Step S300. Herewith, a communication processing function and an information processing function of the relay device 140 can be provided for the edge information system 10 by the auxiliary relay device 240 instead.

The above concludes the description of the operation of information processing system 4.

Next, effects of the fourth example embodiment of the present invention will be described.

The information processing system according to the fourth example embodiment of the present invention is able to improve availability in a widely distributed information processing system, not only when a failure occurs on a communication line connecting a relay device and a server but also when a failure occurs in the relay device itself.

The reason will be described. According to the present example embodiment, in a case that an anomaly exists in a relay device when a failure is detected on a first communication line, a communication-channel-configuration control unit in a management device performs control in such a way that an auxiliary relay device operates as a replacement of the relay device. Specifically, the communication-channel-configuration control unit acquires from the relay device configuration information for operating in place of the relay device on a second communication line in addition to connection information for connecting to the second communication line. Then, the communication-channel-configuration control unit stores the acquired connection information and the acquired configuration information, which are associated with information indicating the relay device. Then, the communication-channel-configuration control unit transmits the stored connection information and the stored configuration information that are associated with information indicating the relay device related to the first communication line on which a failure is detected to an auxiliary-communication-channel configuration unit in the auxiliary relay device selected as the alternative communication channel, and cause the auxiliary-communication-channel configuration unit to set the pieces of information. When delivered to a location of the relay device, the auxiliary relay device connects to the second communication line by using the connection information. When an anomaly does not exist in the relay device, the relay device relays data transmitted and received to and from the device, and transmits and receives the data to and from the server through the auxiliary relay device and a third communication line, similarly to the second example embodiment of the present invention. When connection to the second communication line is unsuccessful or when an anomaly exists in the relay device, the auxiliary relay device operates as a replacement of the relay device on the second communication line, by using the configuration information received from the communication-channel-configuration control unit. Specifically, by the auxiliary-communication-channel configuration unit setting a fourth communication unit to operate as a master unit on the second communication line, data are transmitted and received to and from the device, without passing through the relay device. Further, the auxiliary-communication-channel configuration unit sets the auxiliary communication processing unit to execute processing similarly to the communication processing unit in the relay device. Further, the auxiliary-communication-channel configuration unit sets the auxiliary information processing unit to execute processing similarly to the information processing unit in the relay device.

Thus, even when a failure occurs not only on the first communication line but also in the relay device itself, the present example embodiment delivers an auxiliary relay device selected from auxiliary relay devices not provided for individual relay devices and causes the auxiliary relay device to operate as an alternative to the relay device. Herewith, the present example embodiment is able to continue the data relay processing between the server and the device.

Fifth Example Embodiment

Next, a fifth example embodiment of the present invention will be described in detail with reference to drawings. In the second example embodiment of the present invention, an example of the failure detection unit monitoring the first communication line by using ping request and response packets or keep-alive packets has been described. In the present example embodiment, an example of a failure detection unit performing monitoring by using an estimated value of an available bandwidth on the first communication line will be described. In each drawing referred to in the description of the present example embodiment, a configuration similar to and a step operating similarly to those according to the second example embodiment of the present invention are respectively given reference signs identical to those in the second example embodiment, and detailed description in the present example embodiment is omitted.

Figure 18:
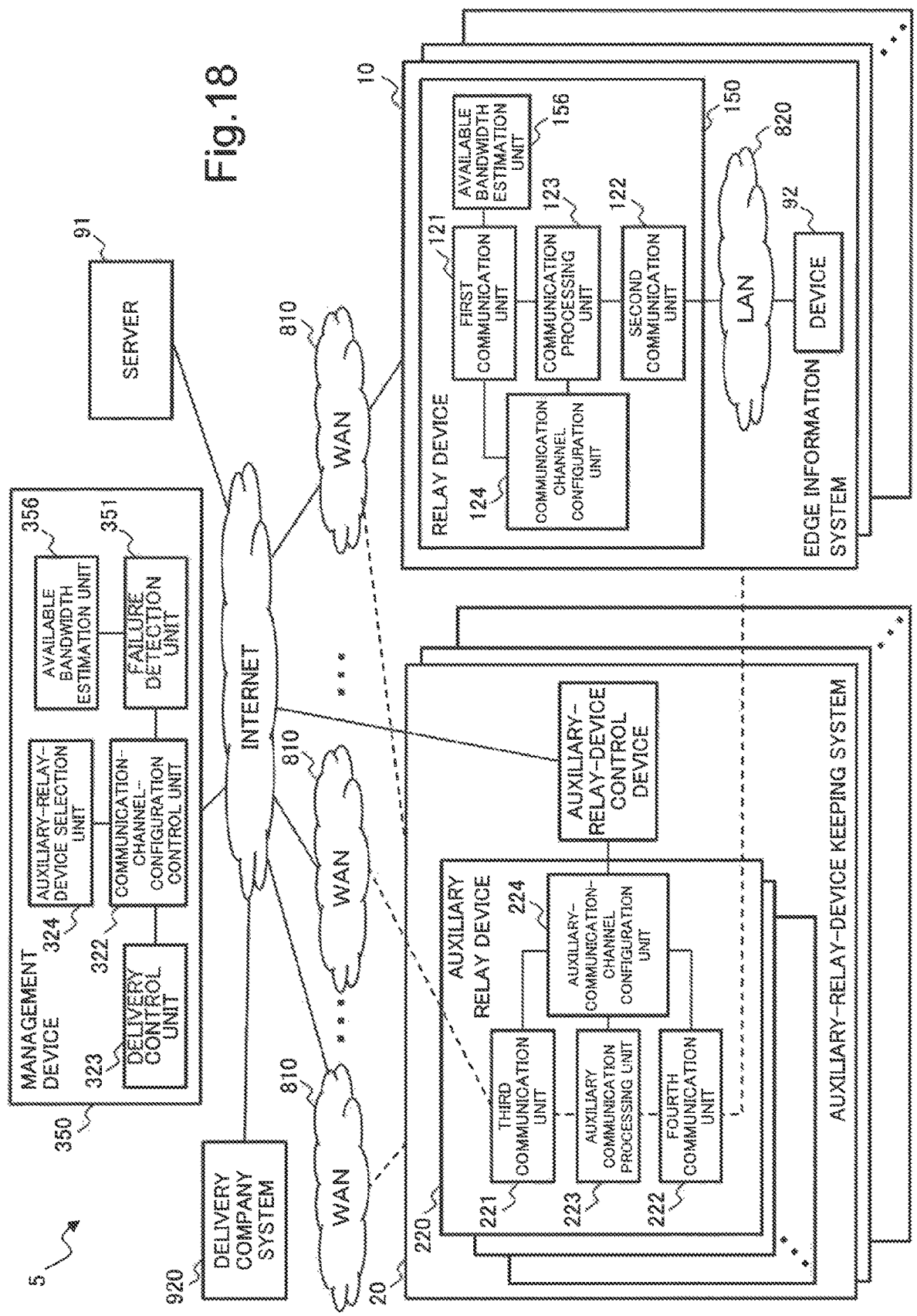
FIG. 18 is a block diagram illustrating a configuration of an information processing system according to a fifth example embodiment of the present invention.

First, a configuration of an information processing system 5 according to the fifth example embodiment of the present invention will be described by using FIG. 18. In FIG. 18, the information processing system 5 differs from the information processing system 2 according to the second example embodiment of the present invention in including a relay device 150 in place of the relay device 120 and a management device 350 in place of the management device 320. Further, the relay device 150 includes an available bandwidth estimation unit 156 in addition to a configuration similar to that of the relay device 120 according to the second example embodiment of the present invention. The available bandwidth estimation unit 156 constitutes an example embodiment of part of the communication processing unit according to the present invention. Further, the management device 350 differs from the management device 320 according to the second example embodiment of the present invention in including a failure detection unit 351 in place of the failure detection unit 321 and further including an available bandwidth estimation unit 356. The available bandwidth estimation unit 356 constitutes an example embodiment of part of the failure detection unit according to the present invention.

Next, out of the functional blocks in the management device 350, configurations different from those according to the second example embodiment of the present invention will be described.

The available bandwidth estimation unit 356 operates in cooperation with the available bandwidth estimation unit 156 in the relay device 150. Specifically, the available bandwidth estimation unit 356 estimates an available bandwidth in a communication channel between the management device 350 and the relay device 150, the channel passing through the WAN 810-$i$. A known technology of estimating an available bandwidth is applicable to the available bandwidth estimation unit 356. For example, the available bandwidth estimation unit 356 may be configured with a transmission-side device or a reception-side device in an available bandwidth estimation system disclosed in a known literature "WO 2014/017140 A1" but is not limited to the above.

The failure detection unit 351 instructs the available bandwidth estimation unit 356 to estimate an available bandwidth to the relay device 150, and based on the result, determines existence or nonexistence of an anomaly in the WAN 810-$i$.

Next, out of the functional blocks in the relay device 150, a configuration different from that according to the second example embodiment of the present invention will be described.

The available bandwidth estimation unit 156 operates in cooperation with the available bandwidth estimation unit 356 in the management device 350. Specifically, the available bandwidth estimation unit 156 estimates an available bandwidth in the communication channel between the management device 350 and the relay device 150, the channel passing through the WAN 810-$i$. For example, it is assumed that the available bandwidth estimation unit 356 in the management device 350 is configured with a transmission-side device or a reception-side device in an available bandwidth estimation system disclosed in PTL 1. In this case, the available bandwidth estimation unit 156 may be configured with the reception-side device or the transmission-side device in the available bandwidth estimation system disclosed in PTL 1. However, the configuration of the available bandwidth estimation unit 156 is not limited to the above.

An operation of the information processing system 5 configured as described above will be described in detail with reference to drawings. (A) initial registration processing and (C) alternative communication channel configuration processing in the information processing system 5 are similar to the operations according to the second example embodiment of the present invention, and therefore description in the present example embodiment is omitted. (B) WAN monitoring processing will be described here.

(B) WAN Monitoring Processing

Figure 19:
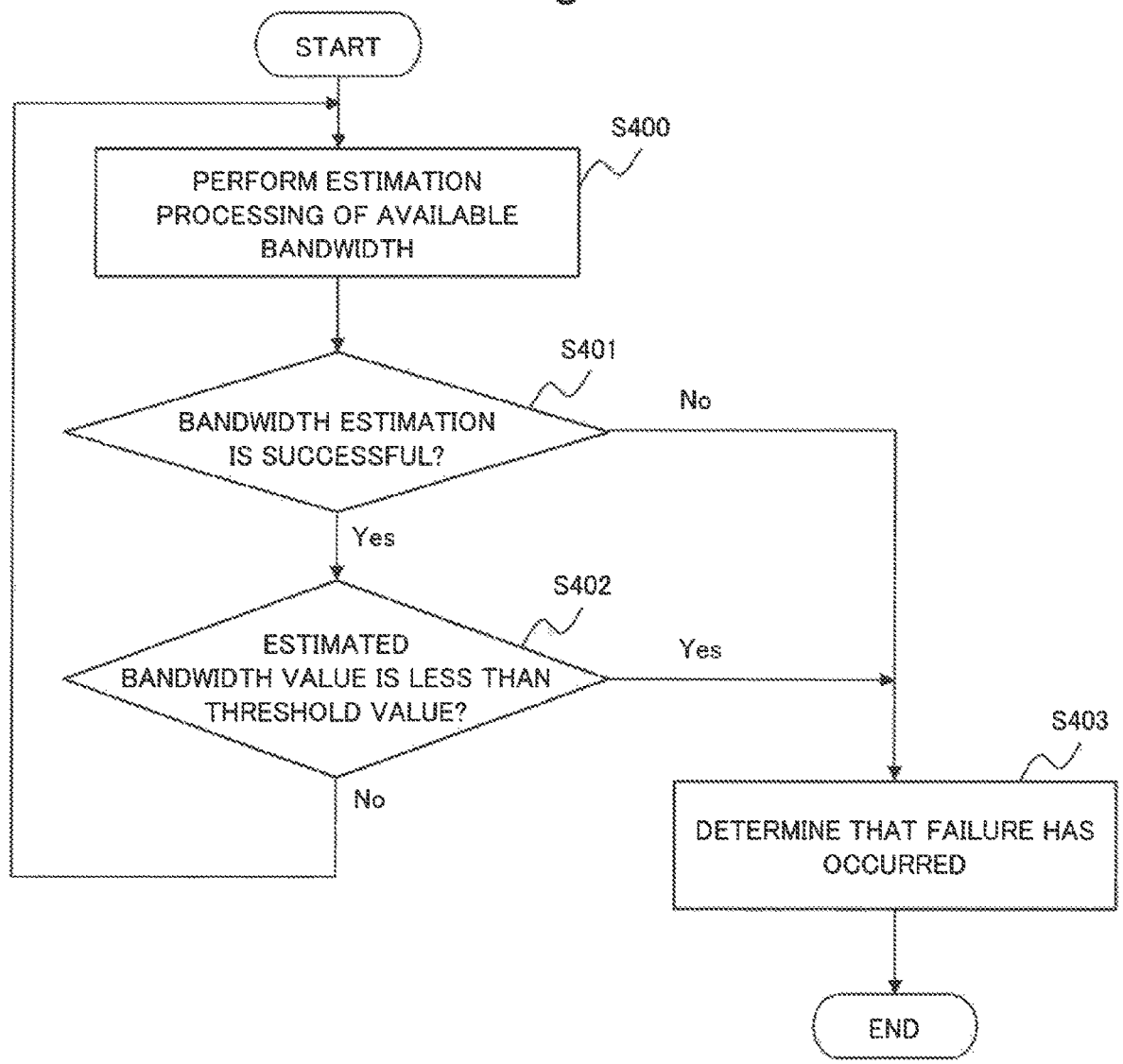
FIG. 19 is a flowchart illustrating WAN monitoring processing in the information processing system according to the fifth example embodiment of the present invention.

Processing of the failure detection unit 351 in the management device 350 monitoring the WAN 810-$i$ will be described by using a flowchart in FIG. 19. The operation of the WAN monitoring processing exemplified in FIG. 19 is started by an instruction by the communication-channel-configuration control unit 322 in Step S107.

First, the failure detection unit 351 instructs the available bandwidth estimation unit 356 to estimate an available bandwidth to the relay device 150 (Step S400).

The available bandwidth estimation unit 356 receiving the instruction estimates an available bandwidth in a communication channel between the management device 350 and the relay device 150, the channel passing through the WAN 810-$i$, in cooperation with the available bandwidth estimation unit 156 in the relay device 150. Then, the available bandwidth estimation unit 356 notifies the failure detection unit 351 of the bandwidth value being estimated (estimated bandwidth value).

Next, the failure detection unit 351 determines whether or not the bandwidth estimation is successful (Step S401).

When the bandwidth estimation is successful, the failure detection unit 351 confirms whether or not the acquired estimated bandwidth value is less than a predetermined threshold value (Step S402).

Then, a case of the estimated bandwidth value being less than the predetermined threshold value or the bandwidth estimation not being successful in Step S401 will be described. In this case, the failure detection unit 351 determines that a failure has occurred in the WAN 810-$i$ and sends a notification to the communication-channel-configuration control unit 322 (Step S403).

Further, when the estimated bandwidth value acquired in Step S402 is greater than or equal to the predetermined threshold value, the failure detection unit 351 repeats the processing from Step S400. At that time, a predetermined pause time may be provided before performing a next bandwidth estimation.

The above concludes the description of the operation of information processing system 5.

Next, effects of the fifth example embodiment of the present invention will be described.

The information processing system according to the fifth example embodiment of the present invention is able to provide effects similar to those provided by the second example embodiment of the present invention with yet more accurate estimation of a failure on a first communication line.

The reason will be described. According to the present example embodiment, the failure detection unit estimates an available bandwidth in the first communication line by using the available bandwidth estimation unit provided on the management device side and the available bandwidth estimation unit provided on the relay device side, and detects a failure on the first communication line, based on the estimated bandwidth value.

Sixth Example Embodiment

Next, an information processing system 6 being a minimum configuration for implementing the present invention will be described as a sixth example embodiment of the present invention with reference to drawings. In each drawing referred to in the description of the present example embodiment, a configuration similar to that according to the first example embodiment of the present invention is given a reference sign identical to that in the first example embodiment, and detailed description in the present example embodiment is omitted.

Figure 20:
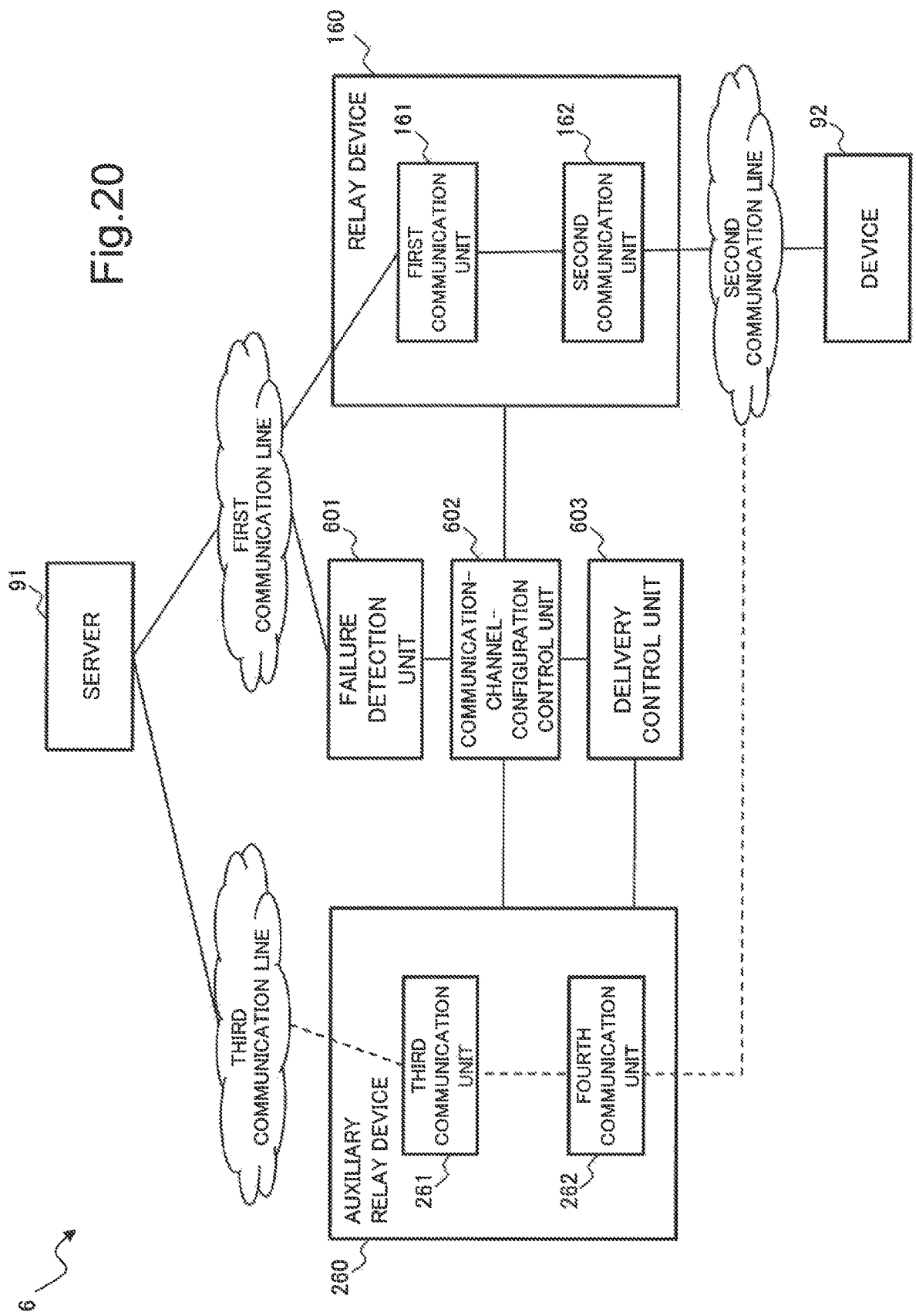
FIG. 20 is a block diagram illustrating a configuration of an information processing system according to a sixth example embodiment of the present invention.

First, FIG. 20 illustrates a configuration of the information processing system 6 according to the sixth example embodiment of the present invention. In FIG. 20, the information processing system 6 includes a relay device 160, an auxiliary relay device 260, a failure detection unit 601, a communication-channel-configuration control unit 602, and a delivery control unit 603. Further, the relay device 160 is connected to a server 91 through a first communication line. Further, the relay device 160 is connected to a device 92 through a second communication line. Further, the auxiliary relay device 260 may be connected to the server 91 through a third communication line. As described in the first to fifth example embodiments of the present invention, the server 91 is a device performing information processing for providing a service. Further, the device 92 is a device using the service by the server 91.

In FIG. 20, a solid line connecting rectangles representing functional blocks indicates that the functional blocks are mutually communicable during normal operation of the information processing system 6. Further, a broken line connecting rectangles representing functional blocks indicates that the functional blocks may be connected when a failure occurs on the first communication line.

Further, while FIG. 20 illustrates one each of the relay device 160, the auxiliary relay device 260, the failure detection unit 601, the communication-channel-configuration control unit 602, and the delivery control unit 603, numbers of the components included in the information processing system 6 are not limited. Further, while FIG. 20 illustrates one each of the server 91 and the device 92, numbers of the devices connectable to the information processing system 6 are not limited.

Figure 21:
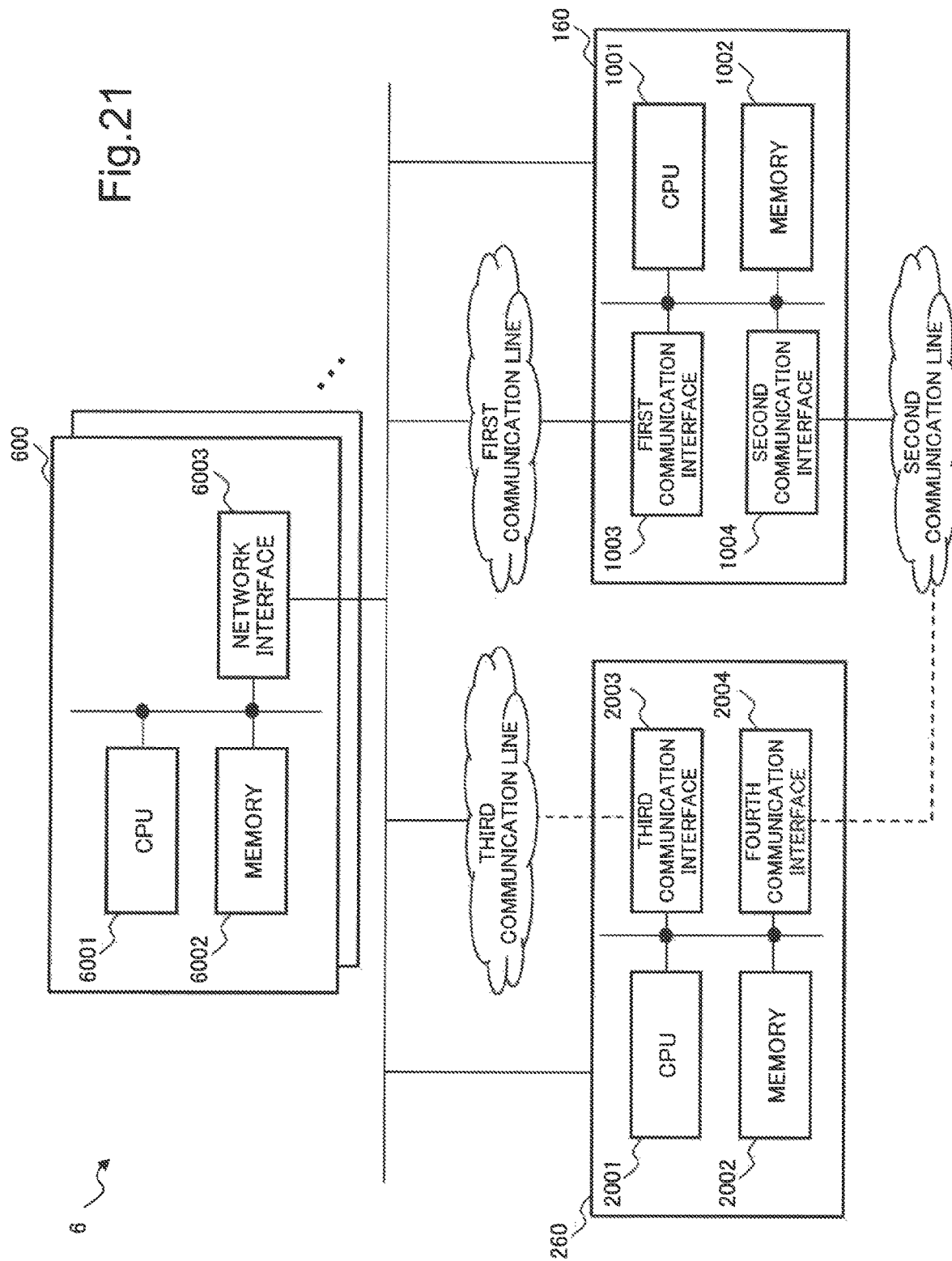
FIG. 21 is a diagram illustrating a hardware configuration example of the information processing system according to the sixth example embodiment of the present invention.

A hardware configuration of the information processing system 6 will be described with reference to FIG. 21. In FIG. 21, the relay device 160 may be configured with hardware components similar to those in the relay device 110 according to the first example embodiment of the present invention described with reference to FIG. 2. Further, the auxiliary relay device 260 may be configured with hardware components similar to those in the auxiliary relay device 210 according to the first example embodiment of the present invention described with reference to FIG. 2. Further, the failure detection unit 601, the communication-channel-configuration control unit 602, and the delivery control unit 603 may be configured with a computer device 600 including a CPU 6001, a memory 6002, and a network interface 6003. However, the failure detection unit 601, the communication-channel-configuration control unit 602, and the delivery control unit 603 may be configured in part or in whole with different computer devices 600. The memory 6002 is composed of a RAM, a ROM, an auxiliary storage device, and the like. The network interface 6003 is an interface connected to a network communicable with the relay device 160 and the auxiliary relay device 260. While FIG. 21 illustrates two computer devices 600, a number of computer devices each constituting the failure detection unit 601, the communication-channel-configuration control unit 602, and the delivery control unit 603 is not limited.

Next, details of the respective functional blocks in the information processing system 6 will be described.

The relay device 160 includes a first communication unit 161 being connected to the first communication line and communicating with the server 91, and a second communication unit 162 being connected to the second communication line and communicating with the device 92. Further, the relay device 160 relays data between the first communication unit 161 and the second communication unit 162.

The auxiliary relay device 260 includes a third communication unit 261 that may be connected to the third communication line and communicate with the server 91, and a fourth communication unit 262 configurable to be connected to the second communication line and perform communication. Further, the auxiliary relay device 260 relays data between the third communication unit 261 and the fourth communication unit 262.

The auxiliary relay device 260 is a device that may be connected to the second communication line in order to configure the alternative communication channel being an alternative to the first communication line when a failure occurs on the first communication line. The auxiliary relay device 260 may be placed at a location not connectable to the second communication line connected to the relay device 160, during normal operation. In this case, when a failure occurs on the first communication line, the auxiliary relay device 260 is delivered to a location where the auxiliary relay device 260 is connectable to the second communication line, under control of the delivery control unit 603 to be described later.

The failure detection unit 601 is configured similarly to the failure detection unit 311 according to the first example embodiment of the present invention. Additionally, when detecting a failure on the first communication line, the failure detection unit 601 transmits information indicating the failure detection to the communication-channel-configuration control unit 602.

The communication-channel-configuration control unit 602 is configured to operate similarly to the communication-channel-configuration control unit 312 according to the first example embodiment of the present invention when receiving information indicating failure detection on the first communication line. Additionally, the communication-channel-configuration control unit 602 transmits to the delivery control unit 603 information instructing to perform control of delivering the auxiliary relay device 260 to a location where the fourth communication unit 262 is connectable to the second communication line.

The delivery control unit 603 is configured to operate similarly to the delivery control unit 313 according to the first example embodiment of the present invention when receiving information instructing to perform control of delivering the auxiliary relay device 260.

An operation of the information processing system 6 configured as described above will be described with reference to FIG. 22.

In FIG. 22, first, the communication-channel-configuration control unit 602 performs processing to be previously executed before occurrence of a failure on the first communication line, as control on the relay device 160 for configuring the alternative communication channel (Step S601).

As described above, for example, the communication-channel-configuration control unit 602 may execute processing of previously collecting from the communication channel configuration unit 114 in the relay device 160 information required in the auxiliary relay device 260 when configuring the alternative communication channel.

Next, in accordance with the control by the communication-channel-configuration control unit 602, the relay device 160 executes the processing to be previously performed within the processing for configuring the alternative communication channel (Step S602). For example, the relay device 160 may execute processing of transmitting to the communication-channel-configuration control unit 602 the information required in the auxiliary relay device 260 when configuring the alternative communication channel.

Next, the failure detection unit 601 determines whether or not a failure has occurred on the first communication line (Step S603).

When a failure has not occurred, the failure detection unit 601 periodically repeats the processing in Step S603.

On the other hand, a case that a failure has occurred (Yes in Step S603) will be described. In this case, the failure detection unit 601 transmits information indicating the failure occurrence on the first communication line to the communication-channel-configuration control unit 602 (Step S604).

Next, the communication-channel-configuration control unit 602 performs processing of controlling the auxiliary relay device 260 in such a way as to configure the alternative communication channel being an alternative to the first communication line by using the third communication line and the auxiliary relay device 260 (Step S605).

Specifically, for example, the communication-channel-configuration control unit 602 may transmit to the auxiliary relay device 260 the information required when configuring the alternative communication channel, the information being previously collected from the relay device 160 and stored.

Next, the communication-channel-configuration control unit 602 transmits to the delivery control unit 603 information instructing to perform control in such a way as to deliver the auxiliary relay device 260 to a location where the fourth communication unit 262 is connectable to the second communication line (Step S606).

Next, the delivery control unit 603 performs control for delivering the auxiliary relay device 260 to a location where the fourth communication unit 262 is connectable to the second communication line (Step S607).

Herewith, the auxiliary relay device 260 is delivered to a location where the fourth communication unit 262 is connectable to the second communication line.

Next, the auxiliary relay device 260 performs processing of configuring the alternative communication channel, in accordance with the control by the communication-channel-configuration control unit 602 in Step S605 (Step S608).

Specifically, for example, it is assumed in Step S605 that the auxiliary relay device 260 receives from the communication-channel-configuration control unit 602 the information required when configuring the alternative communication channel. In this case, the auxiliary relay device 260 may set the information required when configuring the alternative communication channel to the respective units at least including the fourth communication unit 262.

Next, the auxiliary relay device 260 attempts connection to the second communication line by using the fourth communication unit 262 (Step S609).

When connection to the second communication line by the fourth communication unit 262 is not successful (No in Step S610), the auxiliary relay device 260 repeats Step S609.

On the other hand, a case of connection to the second communication line by the fourth communication unit 262 being successful (Yes in Step S610) will be described. In this case, the auxiliary relay device 260 performs processing of relaying data between the third communication unit 261 and the fourth communication unit 262 (Step S611).

It is conceivable to collect information for connecting to the second communication line and set the information to the fourth communication unit 262, as the control for configuring the alternative communication channel in Steps S601, S602, S605, and S608. Further, it is conceivable to collect information for operating in place of the relay device 160 on the second communication line and set the information to the fourth communication unit 262, as the control for configuring the alternative communication channel in these steps. Configuration contents of the alternative communication channel in these cases are as described in the first example embodiment of the present invention, and therefore description in the present example embodiment is omitted.

Thus, even when a failure occurs on the first communication line in the information processing system 6, data relaying between the server 91 and the device 92 is continued by using the alternative communication channel including the auxiliary relay device 260 and the third communication line.

The above concludes the description of the operation of the information processing system 6.

Next, effects of the sixth example embodiment of the present invention will be described.

The information processing system according to the sixth example embodiment of the present invention is able to improve availability in a widely distributed information processing system, without providing an individual relay device with an auxiliary communication line that provides redundancy for a communication line between the relay device and a server.

The reason will be described. According to the present example embodiment, a relay device includes a first communication unit being connected to a first communication line and communicating with a server, and a second communication unit being connected to a second communication line and communicating with a device, and relays data between the first communication unit and the second communication unit. Further, an auxiliary relay device includes a third communication unit that may be connected to a third communication line and communicate with a server, and a fourth communication unit configurable to be connected to the second communication line and perform communication, and is configured to be able to relay data between the third communication unit and the fourth communication unit. At this time, when a failure detection unit detects occurrence of a failure on the first communication line, a communication-channel-configuration control unit controls the relay device and the auxiliary relay device in such a way as to configure an alternative communication channel being an alternative to the first communication line. The alternative communication channel is configured to include the third communication line and the auxiliary relay device. Then, in accordance with the control by the communication-channel-configuration control unit, the relay device and the auxiliary relay device perform processing of configuring the alternative communication channel. Further, a delivery control unit performs control in such a way as to deliver the auxiliary relay device to a location where the fourth communication unit is connectable to the second communication line. Then, the auxiliary relay device attempts connection to the second communication line at the relay device by the fourth communication unit. Then, when the fourth communication unit is connected to the second communication line, the auxiliary relay device relays data between the third communication unit communicating with the server and the fourth communication unit communicating with the device (through or bypassing the relay device).

Thus, the present example embodiment does not need to provide, for each relay device, an auxiliary communication line that provides redundancy for the first communication line connected to the server. For example, even when a relay device is installed at each location where the device is used, the present example embodiment has only to put at least one auxiliary relay device on standby. Consequently, even when a failure occurs on the first communication line connected to the server at any relay device, the present example embodiment is able to configure the alternative communication channel by using the third communication line and the auxiliary relay device.

Further, as described above, the present example embodiment automatically establishes the alternative communication channel when a failure occurs on the first communication line connected to the server at the relay device. Consequently, the present example embodiment is able to restore the data relay processing, without requiring an operator with a technical knowledge about communication channel configuration.

An example of each functional block in each device constituting the information processing systems according to the respective aforementioned example embodiments of the present invention being implemented by a CPU executing a computer program stored in a storage device or a ROM has been mainly described. Without being limited to the above, a part or the whole of each functional block, or a combination thereof may be implemented as dedicated hardware.

Further, each functional block described to be included in the management device according to the respective aforementioned example embodiments of the present invention may be implemented as a plurality of devices in a distributed manner.

Further, the operation of each device described with reference to each flowchart according to the respective aforementioned example embodiments of the present invention may be stored in a storage device (storage medium) in a computer device as a computer program according to the present invention. Then, the CPU may read and execute such a computer program. Then, in such a case, the present invention is configured with a code of such a computer program or the storage medium.

Further, the respective aforementioned example embodiments may be implemented in combination as appropriate.

Further, without being limited to the respective aforementioned example embodiments, the present invention may be implemented in various aspects.

The whole or part of the example embodiments disclosed above can be described as, but not limited to, the following supplementary notes.

(Supplementary Note 1)

An information processing system includes:
a first communication line,
a second communication line,
a third communication line,
a relay device including:
a first memory; and
at least one first processor coupled to the memory,
the first processor performing first operations, the first operations includes:
  controlling communication with a server through the first communication line,
  controlling communication with a device through the second communication line, and
  relaying data between the first communication line and the second communication line;
an auxiliary relay device including
a second memory; and
at least one second processor coupled to the memory,
the second processor performing second operations, the second operations including:
  controlling communication with the server through the third communication line,
  controlling communication with the device through the second communication line, and
  relaying data between the third communication line and the second communication line; and
a management device including:
a third memory; and
at least one third processor coupled to the memory,
the third processor performing third operations, the third operations including:
  detecting a failure on the first communication line;
  when the failure is detected, controlling the auxiliary relay device in such a way as to establish an alternative communication channel being an alternative to the first communication line by using the third communication line and the auxiliary relay device; and
  controlling the auxiliary relay device in such a way as to deliver the auxiliary relay device to a location where the auxiliary relay device is connected to the second communication line.

(Supplementary Note 2)

The information processing system according to supplementary note 1, wherein the third operation further includes
controlling the relay device in such a way that the relay device is connected to the server through the auxiliary relay device the second communication line, and the third communication line.

(Supplementary Note 3)

The information processing system according to supplementary note 1 or 2, wherein the third operation further includes
controlling the auxiliary relay device in such a way that the auxiliary relay device operates as a replacement of the relay device on the second communication line.

(Supplementary Note 4)

The information processing system according to any one of supplementary notes 1 to 3, further includes a plurality of the auxiliary relay devices, wherein the third operation further includes
selecting the auxiliary relay device configuring the alternative communication channel, based on at least any one of a characteristic of the relay device, characteristics of the auxiliary relay devices, and a characteristic of the failure.

(Supplementary Note 5)

The information processing system according to any one of supplementary notes 1 to 4, wherein
the first operation further includes processing relayed data,
the second operation further includes processing relayed data,
the third operation further includes controlling the relay device and the auxiliary relay device in such a way as to cause the second operation further includes processing similar to processing included by the first operation.

(Supplementary Note 6)

The information processing system according to any one of supplementary notes 1 to 5, wherein the third operation further includes
generating information to be used when the auxiliary relay device is connected to the second communication line and storing the generated information to the relay device and the auxiliary relay device.

(Supplementary Note 7)

The information processing system according to any one of supplementary notes 1 to 6, wherein the third operation further includes
collecting, from the relay device, information to be used when the auxiliary relay device is connected to the second communication line and storing the information to the auxiliary relay device.

(Supplementary Note 8)

The information processing system according to any one of supplementary notes 1 to 7, further includes
an auxiliary-relay-device control device that performs physical control on the auxiliary relay device under control of the management device.

(Supplementary Note 9)

9. A relay device in the information processing system according to any one of supplementary notes 1 to 8, the relay device includes:

a first memory; and at least one first processor coupled to the memory, the first processor performing first operations, the first operations including:

controlling communication with a server through the first communication line;

controlling communication with a device through the second communication line; and relaying data between the first communication line and the second communication line.

(Supplementary Note 10)

An auxiliary relay device in the information processing system according to any one of supplementary notes 1 to 8, the auxiliary relay device includes:

a second memory; and at least one second processor coupled to the memory, the second processor performing second operations, the second operations including:

controlling communication with the server through the third communication line;

controlling communication with the device through the second communication line;

relaying data between the third communication line and the second communication line.

(Supplementary Note 11)

A management device in the information processing system according to any one of supplementary notes 1 to 8, the management device includes:

a third memory; and at least one third processor coupled to the memory, the third processor performing third operations, the third operations including:

detecting a failure on the first communication line;

when the failure is detected, controlling the auxiliary relay device in such a way as to establish an alternative communication channel being an alternative to the first communication line by using the third communication line and the auxiliary relay device; and controlling the auxiliary relay device in such a way as to deliver the auxiliary relay device to a location where the auxiliary relay device is connected to the second communication line.

(Supplementary Note 12)

A method includes, for an information processing system, the information processing system including:

a first communication line;

a second communication line;

a third communication line;

a relay device;

an auxiliary relay device; and a management device, the method including:

by the relay device, controlling communication with a server through the first communication line, controlling communication with a device through the second communication line, and relaying data between the first communication line and the second communication line, by the auxiliary relay device, controlling communication with the server through the third communication line, controlling communication with the device through the second communication line, and relaying data between the third communication line and the second communication line; and by the management device detecting a failure on the first communication line, when the failure is detected, controlling the auxiliary relay device in such a way as to establish an alternative communication channel being an alternative to the first communication line by using the third communication line and the auxiliary relay device, and controlling the auxiliary relay device in such a way as to deliver the auxiliary relay device to a location where the auxiliary relay device is connected to the second communication line.

(Supplementary Note 13)

A non-transitory computer-readable storage medium embodying a program, the program causing a first computer device to perform a first method, the first method including:

controlling communication with a server through the first communication line, controlling communication with a device through the second communication line, and relaying data between the first communication line and the second communication line;

causing a second computer to perform a second method, the second method including:

controlling communication with the server through the third communication line, controlling communication with the device through the second communication line, and relaying data between the third communication line and the second communication line; and causing a third computer to perform a third method, the third method including:

detecting a failure on the first communication line, when the failure is detected, controlling the auxiliary relay device in such a way as to establish an alternative communication channel being an alternative to the first communication line by using the third communication line and the auxiliary relay device, and controlling the auxiliary relay device in such a way as to deliver the auxiliary relay device to a location where the auxiliary relay device is connected to the second communication line.

While the invention is particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-103149, filed on May 24, 2016, the disclosure of which is incorporated herein in its entirety by reference.

REFERENCE SINGS LIST 1, 2, 3, 4, 5 Information processing system
10 Edge information system
20 Auxiliary-relay-device keeping system
91 Server
92 Device
110, 120, 140, 150, 160 Relay device
111, 121, 161 First communication unit
112, 122, 162 Second communication unit
113, 123 Communication processing unit
114, 124 Communication channel configuration unit
145 Information processing unit
156 Available bandwidth estimation unit
210, 220, 240, 260 Auxiliary relay device
211, 221, 261 Third communication unit 212, 222, 242, 262 Fourth communication unit
213, 223 Auxiliary communication processing unit
214, 224, 244 Auxiliary-communication-channel-configuration unit
245 Auxiliary information processing unit
310, 320, 330, 340, 350 Management device
311, 321, 351, 601 Failure detection unit
312, 322, 342, 602 Communication-channel-configuration control unit
313, 323, 333, 603 Delivery control unit
324 Auxiliary-relay-device selection unit
335 Moving device control unit
356 Available bandwidth estimation unit
420 Auxiliary-relay-device control device
820 LAN
810 WAN
920 Delivery company system
930 Moving device
931 Movement control unit
932 Conveyed article control unit
1001, 2001, 3001, 9301 CPU
1002, 2002, 3002, 9302 Memory
1003 First communication interface
1004 Second communication interface
2003 Third communication interface
2004 Fourth communication interface
3003, 9306 Network interface
9303 Driving device
9304 Sensor
9305 Conveyed article control device

What is claimed is:

1. An information processing system comprising:
a first communication line,
a second communication line,
a third communication line,
a relay device comprising:
  a first memory; and
  at least one first processor coupled to the memory,
  the first processor performing first operations, the first operations comprising:
    controlling communication with a server through the first communication line,
    controlling communication with a device through the second communication line, and
    relaying data between the first communication line and the second communication line;
an auxiliary relay device including comprising:
  a second memory; and
  at least one second processor coupled to the memory,
  the second processor performing second operations, the second operations comprising:
    controlling communication with the server through the third communication line,
    controlling communication with the device through the second communication line, and
    relaying data between the third communication line and the second communication line; and
a management device comprising:
  a third memory; and
  at least one third processor coupled to the memory,
  the third processor performing third operations, the third operations comprising:
    detecting a failure on the first communication line;
    when the failure is detected, controlling the auxiliary relay device in such a way as to establish an alternative communication channel being an alternative to the first communication line by using the third communication line and the auxiliary relay device; and
    controlling the auxiliary relay device in such a way as to deliver the auxiliary relay device to a location where the auxiliary relay device is connected to the second communication line.

2. The information processing system according to claim 1, wherein the third operation further comprises
controlling the relay device in such a way that the relay device is connected to the server through the auxiliary relay device, the second communication line, and the third communication line.

3. The information processing system according to claim 1, wherein the third operation further comprises
controlling the auxiliary relay device in such a way that the auxiliary relay device operates as a replacement of the relay device on the second communication line.

4. The information processing system according to claim 1, further comprising a plurality of the auxiliary relay devices, wherein the third operation further comprises
selecting the auxiliary relay device configuring the alternative communication channel, based on at least any one of a characteristic of the relay device, characteristics of the auxiliary relay devices, and a characteristic of the failure.

5. The information processing system according to claim 1, wherein
the first operation further comprises processing relayed data,
the second operation further comprises processing relayed data,
the third operation further comprises controlling the relay device and the auxiliary relay device in such a way as to cause the second operation further comprises processing similar to processing comprised by the first operation.

6. The information processing system according to claim 1, wherein the third operation further comprises
generating information to be used when the auxiliary relay device is connected to the second communication line and storing the generated information to the relay device and the auxiliary relay device.

7. The information processing system according to claim 1, wherein the third operation further comprises
collecting, from the relay device, information to be used when the auxiliary relay device is connected to the second communication line and storing the information to the auxiliary relay device.

8. The information processing system according to claim 1, further comprising
an auxiliary-relay-device control device that performs physical control on the auxiliary relay device under control of the management device.

9. A relay device in the information processing system, the information processing system comprising
a first communication line,
a second communication line,
a third communication line,
the relay device,
an auxiliary relay device comprising:
  a second memory; and
  at least one second processor coupled to the memory,
  the second processor performing second operations, the second operations comprising:
    controlling communication with the server through the third communication line, and controlling communication with the device through the second communication line, and
relaying data between the third communication line and the second communication line; and
a management device comprising:
a third memory; and
at least one third processor coupled to the memory,
the third processor performing third operations, the third operations comprising:
detecting a failure on the first communication line;
when the failure is detected, controlling the auxiliary relay device in such a way as to establish an alternative communication channel being an alternative to the first communication line by using the third communication line and the auxiliary relay device; and
controlling the auxiliary relay device in such a way as to deliver the auxiliary relay device to a location where the auxiliary relay device is connected to the second communication line,
the relay device comprising:
a first memory; and
at least one first processor coupled to the memory,
the first processor performing first operations, the first operations comprising:
controlling communication with a server through the first communication line;
controlling communication with a device through the second communication line; and
relaying data between the first communication line and the second communication line.

10. An auxiliary relay device in the information processing system, the information processing system comprising
a first communication line,
a second communication line,
a third communication line,
a relay device comprising:
a first memory; and
at least one first processor coupled to the memory,
the first processor performing first operations, the first operations comprising:
controlling communication with a server through the first communication line,
controlling communication with a device through the second communication line, and
relaying data between the first communication line and the second communication line;
the auxiliary relay device; and
a management device comprising:
a third memory; and
at least one third processor coupled to the memory,
the third processor performing third operations, the third operations comprising:
detecting a failure on the first communication line;
when the failure is detected, controlling the auxiliary relay device in such a way as to establish an alternative communication channel being an alternative to the first communication line by using the third communication line and the auxiliary relay device; and
controlling the auxiliary relay device in such a way as to deliver the auxiliary relay device to a location where the auxiliary relay device is connected to the second communication line,
the auxiliary relay device comprising:
a second memory; and
at least one second processor coupled to the memory,
the second processor performing second operations, the second operations comprising:
controlling communication with the server through the third communication line;
controlling communication with the device through the second communication line:
relaying data between the third communication line and the second communication line.

11. A management device in the information processing system, the information processing system comprising
a first communication line,
a second communication line,
a third communication line,
a relay device comprising:
a first memory; and
at least one first processor coupled to the memory,
the first processor performing first operations, the first operations comprising:
controlling communication with a server through the first communication line,
controlling communication with a device through the second communication line, and
relaying data between the first communication line and the second communication line;
an auxiliary relay device comprising:
a second memory; and
at least one second processor coupled to the memory,
the second processor performing second operations, the second operations comprising:
controlling communication with the server through the third communication line, and
controlling communication with the device through the second communication line, and
relaying data between the third communication line and the second communication line; and
the management device, the management device comprising:
a third memory; and
at least one third processor coupled to the memory,
the third processor performing third operations, the third operations comprising:
detecting a failure on the first communication line;
when the failure is detected, controlling the auxiliary relay device in such a way as to establish an alternative communication channel being an alternative to the first communication line by using the third communication line and the auxiliary relay device; and
controlling the auxiliary relay device in such a way as to deliver the auxiliary relay device to a location where the auxiliary relay device is connected to the second communication line.

12. A method for an information processing system, the information processing system including:
a first communication line;
a second communication line;
a third communication line;
a relay device;
an auxiliary relay device; and
a management device, the method comprising:
by the relay device,
controlling communication with a server through the first communication line, controlling communication with a device through the second communication line, and relaying data between the first communication line and the second communication line, by the auxiliary relay device, controlling communication with the server through the third communication line, controlling communication with the device through the second communication line, and relaying data between the third communication line and the second communication, and by the management device detecting a failure on the first communication line, when the failure is detected, controlling the auxiliary relay device in such a way as to establish an alternative communication channel being an alternative to the first communication line by using the third communication line and the auxiliary relay device, and controlling the auxiliary relay device in such a way as to deliver the auxiliary relay device to a location where the auxiliary relay device is connected to the second communication line.

13. A non-transitory computer-readable storage medium embodying a program, the program causing a first computer device to perform a first method, the first method comprising:

controlling communication with a server through the first communication line, controlling communication with a device through the second communication line, and relaying data between the first communication line and the second communication line;

causing a second computer to perform a second method, the second method comprising:

controlling communication with the server through the third communication line, controlling communication with the device through the second communication line, and relaying data between the third communication line and the second communication line; and causing a third computer to perform a third method, the third method comprising:

detecting a failure on the first communication line, when the failure is detected, controlling the auxiliary relay device in such a way as to establish an alternative communication channel being an alternative to the first communication line by using the third communication line and the auxiliary relay device, and controlling the auxiliary relay device in such a way as to deliver the auxiliary relay device to a location where the auxiliary relay device is connected to the second communication line.

* * * * *